(12) United States Patent
Iwasawa et al.

(10) Patent No.: US 10,360,823 B2
(45) Date of Patent: Jul. 23, 2019

(54) LABEL, METHOD FOR PRODUCING LABEL, METHOD FOR USING LABEL, AND ADHEREND HAVING LABEL

(71) Applicant: YUPO CORPORATION, Tokyo (JP)

(72) Inventors: Yuta Iwasawa, Ibaraki (JP); Kazuhisa Kitamura, Tokyo (JP); Takahiro Zama, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 204 days.

(21) Appl. No.: 15/308,662

(22) PCT Filed: May 19, 2015

(86) PCT No.: PCT/JP2015/064291
§ 371 (c)(1),
(2) Date: Nov. 3, 2016

(87) PCT Pub. No.: WO2015/182435
PCT Pub. Date: Dec. 3, 2015

(65) Prior Publication Data
US 2017/0140676 A1 May 18, 2017

(30) Foreign Application Priority Data
May 29, 2014 (JP) .................................. 2014-111580

(51) Int. Cl.
*G09F 3/00* (2006.01)
*G09F 3/03* (2006.01)
(Continued)

(52) U.S. Cl.
CPC ............... *G09F 3/03* (2013.01); *B31D 1/02* (2013.01); *B31D 1/021* (2013.01); *B32B 7/02* (2013.01);
(Continued)

(58) Field of Classification Search
None
See application file for complete search history.

(56) References Cited

U.S. PATENT DOCUMENTS 6,984,427 B2 * 1/2006 Galkiewicz ............... B44C 1/17
428/40.1
2003/0031861 A1 2/2003 Reiter et al.
(Continued)

FOREIGN PATENT DOCUMENTS

CN 1977297 A 6/2007
CN 102576502 A 7/2012
(Continued)

OTHER PUBLICATIONS

Derwent abstract for JP 2013092620 A (Year: 2013).*
(Continued)

*Primary Examiner* — Frank D Ducheneaux
(74) *Attorney, Agent, or Firm* — Greenblum & Bernstein, P.L.C.

(57) ABSTRACT

A label containing a base layer (A) and an adhesive layer (C) provided in contact with one surface of the base layer (A), wherein the base layer (A) contains a thermoplastic resin and at least one of inorganic fine powder and an organic filler, and the base layer (A) is stretched in at least one direction, and the film has an internal bond strength measured according to TAPPI T569 of from 0.4 to 0.95 kg·cm on a side of the adhesive layer (C) and from 0.4 to 1.5 kg·cm on a side opposite thereto, is easily recognized by the naked eye for the fact that the film has been peeled from an adherend, and is difficult to be restored by re-adhering after peeling.

15 Claims, 1 Drawing Sheet

(51) Int. Cl.
    *G09F 3/10*       (2006.01)
    *B31D 1/02*       (2006.01)
    *B32B 7/02*        (2019.01)
    *B32B 7/06*        (2019.01)
    *B32B 7/12*        (2006.01)
    *B32B 27/08*      (2006.01)
    *B32B 27/18*      (2006.01)
    *B32B 27/20*      (2006.01)
    *B32B 27/22*      (2006.01)
    *B32B 27/32*      (2006.01)
    *B32B 27/34*      (2006.01)
    *B32B 27/36*      (2006.01)
    *C09J 7/24*        (2018.01)
    *C09J 7/25*        (2018.01)
    *C09J 7/26*        (2018.01)
    *C09J 7/38*        (2018.01)
    *C08K 3/22*       (2006.01)
    *C08K 5/10*       (2006.01)
    *C08K 5/20*       (2006.01)
    *B32B 27/30*      (2006.01)

(52) U.S. Cl.
CPC ............... *B32B 7/06* (2013.01); *B32B 7/12* (2013.01); *B32B 27/08* (2013.01); *B32B 27/18* (2013.01); *B32B 27/20* (2013.01); *B32B 27/205* (2013.01); *B32B 27/22* (2013.01); *B32B 27/302* (2013.01); *B32B 27/32* (2013.01); *B32B 27/34* (2013.01); *B32B 27/36* (2013.01); *B32B 27/365* (2013.01); *C08K 3/22* (2013.01); *C08K 5/10* (2013.01); *C08K 5/20* (2013.01); *C09J 7/24* (2018.01); *C09J 7/25* (2018.01); *C09J 7/26* (2018.01); *C09J 7/38* (2018.01); *G09F 3/00* (2013.01); *G09F 3/10* (2013.01); *B31D 2201/02* (2013.01); *B32B 2255/10* (2013.01); *B32B 2255/26* (2013.01); *B32B 2264/102* (2013.01); *B32B 2264/104* (2013.01); *B32B 2307/4023* (2013.01); *B32B 2307/50* (2013.01); *B32B 2307/516* (2013.01); *B32B 2307/518* (2013.01); *B32B 2307/54* (2013.01); *B32B 2307/72* (2013.01); *B32B 2405/00* (2013.01); *B32B 2519/00* (2013.01); *B32B 2519/02* (2013.01); *C09J 2203/334* (2013.01); *C09J 2205/106* (2013.01); *C09J 2400/123* (2013.01); *C09J 2400/226* (2013.01)

(56) References Cited

U.S. PATENT DOCUMENTS

| | | | | |
|---|---|---|---|---|
| 2007/0298205 | A1* | 12/2007 | Allen | ............... B32B 27/10 428/41.6 |
| 2011/0159218 | A1* | 6/2011 | Kimura | ............... B32B 7/12 428/34.4 |
| 2011/0159220 | A1 | 6/2011 | Kimura et al. | |

FOREIGN PATENT DOCUMENTS

| | | |
|---|---|---|
| JP | S60-023878 A | 2/1985 |
| JP | S61-231582 A | 10/1986 |
| JP | H10-222071 A | 8/1998 |
| JP | 2003-114621 A | 4/2003 |
| JP | 2013-3182 A | 1/2013 |
| JP | 2013-92620 A | 5/2013 |
| TW | 491766 B | 6/2002 |
| TW | I249709 B | 2/2006 |

OTHER PUBLICATIONS

Human translation of JP 2013003182 (Year: 2013).*
International Search Report issued with respect to Japanese Application No. PCT/JP2015/064291, dated Aug. 18, 2015.
International Preliminary Report on Patentability issued with respect to Japanese Application No. PCT/JP2015/064291, dated Nov. 29, 2016.
Taiwanese Office Action issued in Taiwan Counterpart Patent Application No. 104116313, dated Feb. 14, 2018, along with an English translation thereof.
Extended European Search Report from Application No. 15799595.2 dated Jan. 3, 2018.
WPI Database No. XP-002776799.
Office Action issued in corresponding Chinese Patent Application No. 201580028479.2 dated Sep. 27, 2018.
Notification of Reasons for Refusal issued in corresponding Japanese Patent Application No. 2016-523432 dated Oct. 9, 2018.

* cited by examiner

US 10,360,823 B2

LABEL, METHOD FOR PRODUCING LABEL, METHOD FOR USING LABEL, AND ADHEREND HAVING LABEL

TECHNICAL FIELD

The present invention relates to a label, a method for producing a label, a method for using a label, and an adherend having a label. More specifically, the invention relates to such a label that in the case where the label is adhered to an adherend and then peeled therefrom, the fact that the label has been peeled is capable of being recognized by the naked eye through the breakage of the label, and the label thus peeled is difficult to be returned to the original shape.

BACKGROUND ART

For preventing re-adhesion of a label, there have been plural proposals of a tamper-proof label that is broken by itself on peeling the label to leave a part thereof on an adherend.

For example, PTL 1 describes a brittle label containing a base material, a breakable layer, and an adhesive layer having a concavo-convex shape. On peeling the label from the adherend, the breakable layer is broken in such a manner that at least a portion of the breakable layer that correspond to the convex portion of the adhesive layer remains on the adherend. Accordingly, the fact that the label has been peeled can be recognized by the naked eye with the breakable layer remaining. However, for easily recognizing the peeling of the label by the naked eye, the breakable layer necessarily contains a layer formed of a material capable of being visually recognized easily, such as a colored layer or a metallic luster layer, which may cause a problem of increased process steps for production thereof, thereby raising the cost. Furthermore, the adhesive layer is necessarily broken simultaneously with the breaking of the breakable layer, which may cause a problem that the stress necessary for peeling and the shape of the portion remaining on the adherend may not be stable.

As a label that prevents re-adhesion of the peeled label, there have been plural proposals of such a label that on peeling the label from an adherend, the base material of the label is deformed to a shape that is unable to restore the original shape.

For example, PTL 2 proposes a label containing an adhesive layer that is provided on a plastic film (base material) having a residual strain amount in the longitudinal direction of at least 10%. On peeling the label from an adherend, the plastic film is stretched and undergoes plastic deformation due to the tensile force required for peeling, and thereby the label is unable to be re-adhered on the original location. However, the label does not have such a structure that a part of the label remains on the adherend, and thus the fact that the label has been peeled may not be easily recognized by the naked eye.

PTL 3 proposes a sealing label containing a label that is obtained from a uniaxially stretched film of a resin composition containing from 30 to 75% by weight of a polyolefin and from 70 to 25% by weight of a filler, and an adhesive that is coated on the back surface of the label. On peeling the sealing label from an adherend, the label is easily broken, which is a favorable function as a sealing label, but there is a problem that the broken surface thereof has a linear shape, and thus is difficult to be recognized in the case where the label is re-adhered with the broken surfaces thereof butted each other.

CITATION LIST

Patent Literatures

PTL 1: JP-A-10-222071
PTL 2: JP-A-60-023878
PTL 3: JP-A-61-231582

SUMMARY OF INVENTION

Technical Problem

As described above, in ordinary tamper-proof labels have not yet sufficiently satisfactory due to such problems that the label has a complicated structure, the fact that the label has been peeled is not easily recognized by the naked eye, and the peeled label is easily restored by re-adhering the peeled portions thereof.

Under the circumstances, the present inventors have made investigations for providing a label for preventing re-adhesion that is easily recognized by the naked eye for the fact that the label has been peeled from an adherend, on peeling the label from the adherend, and is difficult to be restored by re-adhering after peeling, even with a simple structure, and an adherend having the label. The inventors have also made investigations for providing a method for producing a label, by which the label may be easily produced.

Solution to Problem

As a result of earnest investigations for solving the problem, the inventors have found that a label that is easily recognized by the naked eye for the fact that the label has been peeled from an adherend, on peeling the label from the adherend, and is difficult to be restored by re-adhering after peeling, even with a simple structure may be obtained by using a base layer of the label that contains a thermoplastic resin and at least one of inorganic fine powder and an organic filler, is stretched in at least one direction, and provides an internal bond strength of a film constituting the label within a particular range. Specifically, the invention includes the following embodiments.

[1] A label containing a film containing a base layer (A), and an adhesive layer (C) provided in contact with one surface of the base layer (A),
the base layer (A) containing a thermoplastic resin and at least one of inorganic fine powder and an organic filler, and being stretched in at least one direction,
the film having an internal bond strength measured according to TAPPI T569 of from 0.4 to 0.95 kg·cm on a side of the adhesive layer (C) and from 0.4 to 1.5 kg·cm on a side opposite thereto.

[2] The label according to [1], wherein the base layer (A) has a porosity shown by the following expression (1) of from 30 to 70%:

$$\text{Porosity of base layer}(A)(\%) = \frac{\rho(A)_0 - \rho(A)}{\rho(A)_0} \times 100 \qquad (1)$$

wherein $\rho(A)_0$ represents a true density of the base layer (A), and $\rho(A)$ represents a density of the base layer (A).

[3] The label according to [1] or [2], wherein the thermoplastic resin contains at least one kind selected from the group consisting of a polyethylene-based resin, a polypropylene-based resin, a polyolefin-based resin, a polyamide-based resin, a thermoplastic polyester-based resin, polycarbonate, and a polystyrene-based resin.

[4] The label according to any one of [1] to [3], wherein the film containing the base layer (A) further contains a surface layer (B) on a side opposite to the adhesive layer (C), the film has an internal bond strength measured according to TAPPI T569 of from 0.4 to 0.95 kg·cm on a side of the base layer (A) and from 0.4 to 1.5 kg·cm on a side of the surface layer (B).

[5] The label according to [4], wherein the base layer (A) and the surface layer (B) have tensile stresses at break measured according to JIS K7161:1994 that satisfy the following expression (2):

$$\sigma_B(A) > \sigma_B(B) \qquad (2)$$

wherein $\sigma_B(A)$ represents the tensile stress at break (MPa) of the base layer (A) on pulling in MD, and $\sigma_B(B)$ represents the tensile stress at break (MPa) of the surface layer (B) on pulling in MD.

[6] The label according to [4] or [5], wherein an adhesion strength between the base layer (A) and the surface layer (B) measured according to JIS K6854-2:1999 is 7.7 N/15 mm or more.

[7] The label according to any one of [4] to [6], wherein the surface layer (B) has a porosity shown by the following expression (3) of from 40 to 700, that is larger than a porosity of the base layer (A):

$$\text{Porosity of surface layer}(B)(\%) = \frac{\rho(B)_0 - \rho(B)}{\rho(B)_0} \times 100 \qquad (3)$$

wherein $\rho(B)_0$ represents a true density of the surface layer (B), and $\rho(B)$ represents a density of the surface layer (B).

[8] The label according to any one of [4] to [7], wherein the base layer (A) and the surface layer (B) are laminated by any measure of co-extrusion forming, extrusion lamination forming, and thermal lamination forming.

[9] The label according to any one of [4] to [8], wherein the base layer (A) is stretched biaxially, and the surface layer (B) is stretched uniaxially.

[10] The label according to any one of [1] to [9], wherein the label has printed information on at least one of a surface of the label opposite to the adhesive layer (C) or a surface of the base layer (A) on a side of the adhesive layer (C).

[11] The label according to any one of [1] to [10], wherein the adhesive layer (C) is provided discontinuously on a surface of the base layer (A).

[12] The label according to any one of [1] to [11], wherein the label has a half cut line on at least one surface of the base layer (A).

[13] The label according to any one of [1] to [12], wherein the label has an adhesion inhibiting part on a surface of the base layer (A) on a side of the adhesive layer (C).

[14] The label according to any one of [1] to [13], wherein the adhesive layer (C) has an emboss shape.

[15] The label according to any one of [1] to [14], wherein the label further contains a release material (D) on a surface of the adhesive layer (C).

[16] An adherend having a label, containing the label according to any one of [1] to [15], and an adherend having the label adhered thereto.

[17] A method for producing the label according to [15], containing providing the adhesive layer (C) on a surface of the base layer (A), and then providing the release material (D) on the adhesive layer (C).

[18] A method for producing the label according to [15], containing providing the adhesive layer (C) on the release material (D), and then laminating the base layer (A) on the adhesive layer (C).

[19] A method for using a label, containing breaking the label on peeling the label from the adherend having a label according to [16].

Advantageous Effects of Invention

According to the invention, a label may be provided that is easily recognized by the naked eye for the fact that the film has been peeled from an adherend, on peeling the label from the adherend, and is difficult to be restored by re-adhering after peeling, even with a simple structure.

According to the method for producing a label of the invention, the label may be easily produced.

DESCRIPTION OF EMBODIMENTS

Figure 1:
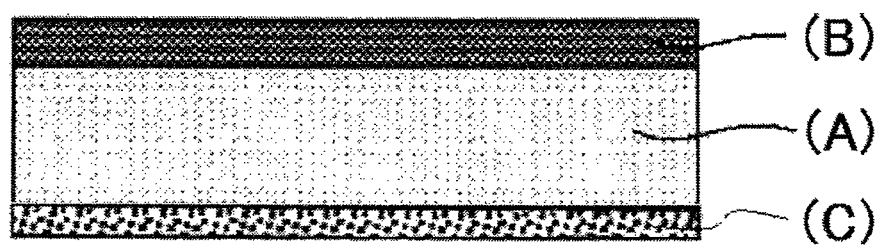
FIG. 1 is a cross sectional view showing one embodiment of a label according to the invention.
Figure 2:
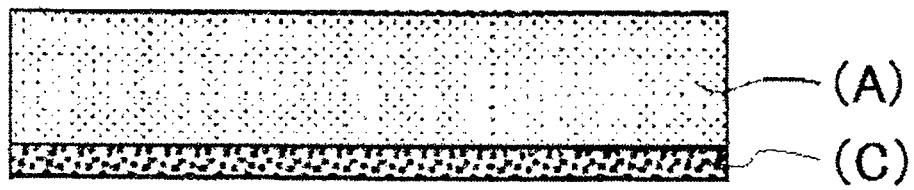
FIG. 2 is a cross sectional view showing another embodiment of a label according to the invention.

The invention will be described in detail below. The following description of the constitutional elements is only examples (representative examples) of embodiments of the invention, and the invention is not limited thereto.

In the description, a numerical range expressed with "to" means a range that includes the numbers before and after "to" as the upper limit and the lower limit, respectively.

In the description, the expression "(meth)acrylic acid" encompasses both acrylic acid and methacrylic acid, and the expression "acrylic resin" encompasses both a polymer and a copolymer obtained by polymerizing a monomer containing at least one of an acrylic acid and a methacrylic acid derivative.

In the description, the expression "major component" means a component that has the largest content in terms of mass, among components contained in a composition.

In the description, the expression "MD" means the direction that is in parallel to the machine direction of the film production apparatus, and the expression "TD" means the direction perpendicular to the machine direction of the film production apparatus. In the case where the film production process is unknown, and the machine direction of the film production apparatus is unclear, the direction within the film surface exhibiting the minimum tensile stress at break is designated as MD, and the direction within the film surface exhibiting the minimum tensile stress at break is designated as TD.

Label

The label contains a film containing a base layer (A), and an adhesive layer (C) provided in contact with one surface of the base layer (A). The base layer (A) contains a thermoplastic resin and at least one of inorganic fine powder and an organic filler, and is stretched in at least one direction. The film constituting the label has an internal bond strength measured according to TAPPI T569 of from 0.4 to 0.95 kg·cm on the side of the adhesive layer (C) and from 0.4 to 1.5 kg·cm on the side opposite thereto.

Base Layer (A)

The base layer (A) is retained on an adherend by adhering to the adherend through the adhesive layer (C) provided in contact with one surface thereof. When the label is to be peeled from the adhered state, the label is not peeled at the interface to the adhesive layer (C), but the base layer (A) is broken to fail to peel the base layer (A) completely, and a part of the base layer (A) remains in an unintended shape on the adherend. The breaking mechanism of the base layer (A) may be estimated as follows.

When the adhered label is to be peeled from the adherend, the base layer (A) receives stress concentration on the surface in contact with the adhesive layer, and the surface of the base layer (A) is broken. The breaking starting from the surface proceeds in the interior of the base layer (A) due to the force of peeling applied, and reaches the surface opposite to the starting point (i.e., the surface in contact with the adhesive layer). Thus, the base layer (A) is entirely broken.

The base layer (A) herein has brittleness with an internal bond strength measured according to TAPPI T569 within a low range of from 0.4 to 0.95 kg·cm.

The base layer (A) herein has many pores formed there-inside by containing a thermoplastic resin and at least one of inorganic fine powder and an organic filler, and being stretched in at least one direction. The base layer (A) used preferably has a low density with a porosity in a range of from 30 to 70%.

Material for Base Layer (A)

The base layer (A) contains a thermoplastic resin and at least one of inorganic fine powder and an organic filler.

Thermoplastic Resin

Examples of the thermoplastic resin include a polyethylene-based resin, such as high density polyethylene, medium density polyethylene and low density polyethylene; a polypropylene-based resin, such as a propylene homopolymer, a propylene random polymer and a propylene copolymer; a polyolefin-based resin, such as polymethyl-1-pentene and an ethylene-cyclic olefin copolymer; a polyamide-based resin, such as nylon-6, nylon-6,6, nylon-6,10 and nylon-6,12; a thermoplastic polyester-based resin, such as polyethylene terephthalate, polyethylene naphthalate, polybutylene succinate, polybutylene adipate, polylactic acid, and aliphatic polyesters obtained by copolymerizing monomers constituting these polymers and another monomer capable of being copolymerized therewith; polycarbonate; a polystyrene-based resin, such as atactic polystyrene and syndiotactic polystyrene; and other thermoplastic resins, such as polyphenylene sulfide. These resins may be used as a mixture of two or more kinds thereof. Among these, a polyethylene-based resin, a polypropylene-based resin, a polyolefin-based resin, and a thermoplastic polyester-based resin are preferably used in terms of cost, water-resistant property, and chemical-resistant property, and a polyethylene-based resin, a polypropylene-based resin, and a polyolefin-based resin are more preferably used.

Examples of the polypropylene-based resin include polypropylene that is a propylene homopolymer and is isotactic or syndiotactic, a polypropylene random polymer, and a copolymer containing propylene as a major component with an α-olefin, such as ethylene, butene-1, hexene-1, heptene-1 and 4-methylpentene-1. The copolymer may be a two-component, three-component or four-component copolymer, and may be a random copolymer or a block copolymer.

Inorganic Fine Powder and Organic Filler

The base layer (A) contains at least one of inorganic fine powder and an organic filler. The internal bond strength and the porosity of the base layer (A) can be controlled by using the inorganic fine powder and the organic filler through changing the particle diameter and the content thereof.

Examples of the inorganic fine powder include calcium carbonate, baked clay, silica, diatom earth, talc, titanium oxide, barium sulfate and alumina.

The organic filer used is preferably resin powder that is of a kind different from the thermoplastic resin used in the base layer (A), is incompatible with the thermoplastic resin, and has a melting point of from 120 to 300° C. or a glass transition temperature of from 120 to 280° C. In the case where the thermoplastic resin is a polyolefin-based resin, for example, examples of the organic filler used include polyethylene terephthalate, polybutylene terephthalate, polycarbonate, nylon-6, nylon-6,6, a homopolymer of a cyclic olefin, and a copolymer of a cyclic olefin and ethylene. The organic filler is preferably crosslinked with a crosslinking agent from the standpoint of the dimensional stability on forming and the formation of porosity of the base layer.

The inorganic fine powder and the organic filler each may be used solely or as a combination of two or more kinds thereof. The inorganic fine powder and the organic filler may be used in combination.

The average particle diameter of the inorganic fine powder and the organic filler used in the base layer (A) is preferably 0.01 μm or more, more preferably 0.05 μm or more, and further preferably 0.1 μm or more, from the standpoint of controlling the porosity of the base layer (A) to the preferred ranges described later. The average particle diameter of the inorganic fine powder and the organic filler is preferably 15 μm or less, more preferably 8 μm or less, and further preferably 4 μm or less, from the same standpoint.

The expression "average particle diameter" referred in the invention, for the inorganic fine powder, a median diameter corresponding to a 50% cumulative value in a volume based particle size distribution measured by a laser diffractiometry according to JIS Z8825-1:2001, and means for the organic filler or a mixture of the inorganic fine powder and the organic filler, an average value of the particle diameters (longer diameters) of 100 particles of the inorganic fine powder and the organic filler found on an observed image of the base layer (A), which is obtained in such a manner that the base layer (A) is produced with the organic filler or a mixture of the inorganic fine powder and the organic filler, and a cross section thereof is observed with an electron microscope.

The total content of the inorganic fine powder and the organic filler in the base layer (A) is preferably 15% by mass or more, and more preferably 20% by mass or more, based on the total amount of all the materials constituting the base layer (A), from the standpoint of controlling the porosity of the base layer (A) to the preferred ranges described later. The total content of the inorganic fine powder and the organic filler in the base layer (A) is preferably 80% by mass or less, more preferably 70% by mass or less, further preferably 60% by mass or less, and particularly preferably 50% by mass or less, based on the total amount of all the materials constituting the base layer (A), from the same standpoint. The total content of the inorganic fine powder and the organic filler in the base layer (A) may be 45% by mass or less, and may also be 35% by mass or less. In the case where any one of the inorganic fine powder and the organic filler is used, the content of any one of them corresponds to the aforementioned total content, and in the case where the inorganic fine powder and the organic filler are used in combination, the total content thereof corresponds to the aforementioned total content. The definition of the content of the fine powder is the same as in the following description.

Additional Components

The base layer (A) may contain, as additional components, a heat stabilizer (antioxidant), a light stabilizer, a dispersant, a lubricant and the like, depending on necessity. Examples of the additional components also include a colorant, a nucleating agent, a plasticizer, a release agent, a flame retardant, an antistatic agent, and an ultraviolet absorbent, described later.

The heat stabilizer may be used for preventing the thermoplastic resin from being deteriorated to use the label for a prolonged period of time. Examples of the heat stabilizer include known materials, such as hindered phenol, phosphorus and amine heat stabilizers (antioxidants) ordinarily known in the art, which may be appropriately used solely or as a combination of two or more kinds thereof.

In the case where the base layer (A) contains the heat stabilizer, the heat stabilizer is preferably contained in an amount of 0.01% by mass or more from the standpoint of the exhibition of the function of the heat stabilizer. The heat stabilizer is preferably contained in an amount of 1.5% by mass or less, more preferably 1% by mass or less, from the standpoint of the improvement of the forming stability and the appearance.

Examples of the light stabilizer include known materials, such as hindered amine, benzotriazole and benzophenone light stabilizers, which may be appropriately used solely or as a combination of two or more kinds thereof. The light stabilizer is preferably used in combination with the heat stabilizer.

In the case where the base layer (A) contains the light stabilizer, the light stabilizer is preferably contained in an amount of 0.01% by mass or more from the standpoint of the exhibition of the function of the light stabilizer. The light stabilizer is preferably contained in an amount of 1.5% by mass or less, more preferably 1% by mass or less, from the standpoint of the improvement of the forming stability and the appearance.

Examples of the dispersant and the lubricant include known materials, such as a silane coupling agent; a fatty acid having from 8 to 24 carbon atoms, e.g., oleic acid and stearic acid, and a metal salt thereof, an amide thereof, and an ester thereof with an alcohol having from 1 to 6 carbon atoms; and a poly(meth)acrylic acid and a metal salt thereof, which may be appropriately used solely or as a combination of two or more kinds thereof.

In the case where the base layer (A) contains the dispersant or the lubricant, the dispersant and the lubricant are preferably contained in an amount of 0.01% by mass or more from the standpoint of the exhibition of the function of the dispersant and the lubricant. The dispersant and the lubricant are preferably contained in an amount of 4% by mass or less, more preferably 2% by mass or less, from the standpoint of the improvement of the forming stability and the appearance.

The contents or amounts referred herein for the additional components each are the content or amount based on the total amount of all the materials constituting the base layer (A).

Properties of Base Layer (A)

Internal Bond Strength

The internal bond strength for a film including the base layer (A) shows the cohesive force of the film, and shows the strength on breaking of the film on applying a tensile force in the thickness direction of the film. Accordingly, the internal bond strength may be smaller, by which the film is easily broken after starting the breaking, which may fit the purpose of the invention.

The film containing the base layer (A) herein means the base layer (A) itself in the case where the film contains only the base layer (A), and in the case where the film contains a layer other than the base layer (A), the film is a laminated film containing the base layer (A) and the layer (for example, a surface layer (B)).

The "internal bond strength" in the invention is a measured value expressed by the unit kg·cm, measured with a Scott bond tester according to the method defined by TAPPI T569, which will be described in detail later.

In the invention, on adhering the label on an adherend, both the internal bond strength of the film containing the base layer (A) on the side of the adhesive layer (C) and the internal bond strength thereof on the side opposite thereto each are set to 0.4 kg·cm or more. The internal bond strengths on both the sides each are preferably 0.45 kg·cm or more, more preferably 0.5 kg·cm or more, and further preferably 0.6 kg·cm or more.

When the internal bond strengths each are 0.4 kg·cm or more, the label is not broken in the normal use to facilitate the adhesion operation of the label. Furthermore, the intended functions of the label, i.e., the information displaying function and the like, can be favorably exhibited.

In the case where the label is peeled, for breaking the film itself while preventing the adherend from being broken even when the adherend has a relatively weak strength, the internal bond strength of the film is set to 1.5 kg·cm or less. In particular, the internal bond strength of the film on the side opposite to the adhesive layer (C) is necessarily set to 1.5 kg·cm or less, and the internal bond strength on the opposite side is preferably 0.95 kg·cm or less, more preferably 0.9 kg·cm or less, further preferably 0.85 kg·cm or less, and particularly preferably 0.8 kg·cm or less. The internal bond strength of the film on the side of the adhesive layer (C) is preferably 0.95 kg·cm or less, more preferably 0.9 kg·cm or less, further preferably 0.85 kg·cm or less, and particularly preferably 0.8 kg·cm or less.

When the internal bond strength of the film on the side opposite to the adhesive layer (C) is 1.5 kg·cm or less, the film is broken on peeling the film from the adherend, and a part of the film remains in an unintended shape on the adherend. The fact that the label has been peeled is capable of being recognized by the naked eye through the remaining part. Furthermore, even if the peeled part is tried to re-adhere the original location, it is difficult to restore the original shape since the peeled part and the remaining part each have an unintended shape. Consequently, the label can be prevented from being re-adhered.

The internal bond strength of the film on the side of the adhesive layer (C) can also be referred to as the internal bond strength on the side of the base layer (A) or the internal bond strength of the base layer (A). In the case where the film is a laminated film containing the base layer (A) and the surface layer (B), the internal bond strength of the film on the side opposite to the adhesive layer (C) can also be referred to as the internal bond strength on the side of the surface layer (B) or the internal bond strength of the surface layer (B).

There is a correlation between the internal bond strength of the base layer (A) and the porosity of the base layer (A). When the porosity of the base layer (A) is larger, the internal bond strength of the base layer (A) is lowered, and when the porosity is smaller, the internal bond strength is increased. Accordingly, in the case where the base layer (A) that is more brittle with a smaller internal bond strength is to be provided, the base layer (A) that has a larger porosity is formed. The internal bond strength and the porosity can be controlled, for example, by changing the stretching temperature on stretching the base layer (A), particularly the stretching temperature in the final stretching step.

Porosity

The porosity of the base layer (A) is a value obtained by the following expression (1).

$$\text{Porosity of base layer}(A)(\%) = \frac{\rho(A)_0 - \rho(A)}{\rho(A)_0} \times 100 \qquad (1)$$

wherein $\rho(A)_0$ represents a true density of the base layer (A), and $\rho(A)$ represents a density of the base layer (A).

In the expression (1), $\rho(A)_0$ represents the true density of the base layer (A) that is measured by the method A of JIS K7112:1999, and $\rho(A)$ represents the density of the base layer (A) that is calculated according to JIS P8118:1998 based on the thickness of the base layer (A) that is measured by the method A of JIS K7130:1999 and the basis weight of the base layer (A) that is measured according to JIS P8124:2011. The true density of the base layer (A) is substantially the same as the density of the base layer (A) before stretching, which may be referred herein, unless the base layer (A) before stretching contains a large amount air.

The internal bond strength of the base layer (A) varies depending on the porosity thereof, and assuming the same material constituting the base layer (A), there is a tendency that a smaller porosity provides a large internal bond strength. Such a case is considered that the label is adhered to an adherend having a small internal bond strength, particularly, a corrugated fiberboard. Even in this case, the base layer (A) is necessarily broken, but the adherend is not broken, on peeling, and therefore the base layer (A) is necessarily breakable to a certain extent. From the standpoint that the internal bond strength on the side of the base layer (A) is controlled to a suitable range, the porosity of the base layer (A) is preferably 30% or more, more preferably 32% or more, and further preferably 35% or more. However, in the case where the base layer (A) is too breakable, the label is liable to be broken in the normal use to impair the adhering operation of the film, and there may be cases where a printed image is damaged by friction or the like to deteriorate the information displaying function and the like. For preventing such states from occurring, the porosity of the base layer (A) is preferably 70% or less, more preferably 65% or less, further preferably 60% or less, particularly preferably 55% or less, and most preferably 50% or less.

The porosity of the base layer (A) may be controlled by the formulation of the resin composition constituting the base layer (A), particular the contents (total content) and the volume average particle diameters of the inorganic fine powder and the organic filler, and the stretching condition of the base layer (A), particularly the stretching ratio and the stretching temperature.

Density

The density $\rho(A)$ of the base layer (A) is preferably 0.35 g/cm³ or more, more preferably 0.40 g/cm³ or more, further preferably 0.50 g/cm³ or more, and particularly preferably 0.60 g/cm³ or more, for controlling the porosity of the base layer (A) to the preferred range. The density $\rho(A)$ of the base layer (A) is preferably 0.80 g/cm³ or less, more preferably 0.75 g/cm³ or less, and further preferably 0.70 g/cm³ or less, from the same standpoint.

Thickness

The thickness T(A) of the base layer (A) is preferably 30 µm or more, more preferably 40 µm or more, further preferably 45 µm or more, and particularly preferably 50 µm or more, from the standpoint of the workability of the secondary processes, such as stretching and forming, application of adhesiveness, and printing. The thickness T(A) of the base layer (A) is preferably 140 µm or less, more preferably 120 µm or less, and further preferably 100 µm or less, from the standpoint of providing such a flexibility that the film may follow the non-planar portion, such as a curved portion and an edge portion, on adhering on a three-dimensional article.

The thickness T(A) of the base layer (A) herein is measured by the method A of JIS K7130:1999.

Stretching of Base Layer (A)

The base layer (A) is stretched in at least one direction. The base layer (A) is more preferably stretched uniaxially or biaxially. In the case of the biaxial stretching performed, any of simultaneous biaxial stretching and sequential biaxial stretching may be used. The stretching direction of the base layer (A) may be in parallel or perpendicular to the MD thereof, or may not be in parallel and perpendicular to the MD thereof. For the stretching method, reference may be made to the description for the method for producing a label described later.

Layer Structure of Base Layer (A)

The base layer (A) may contain only a single layer or may have a multilayer structure. Examples of the case of the multilayer structure include a two-layer structure containing a main layer having the largest thickness and a skin layer, and a three-layer structure containing a first skin layer, a main layer, and a second skin layer.

The skin layer may be provided for enhancing the stability on forming and the durability unless the easy breaking property is impaired. The formulation of the skin layer may be the same as or different from the formulation of the base layer (A). In the case where plural skin layers are provided, skin layers having the same formulation may be provided, and skin layers having different formulations may be provided.

For example, in the case where a skin layer is the outermost layer of the label, the contents of the components that are preferably contained in larger amounts in the surface portion of the label, such as a heat stabilizer (antioxidant), a light stabilizer, a colorant, a nucleating agent, a release agent, and an antistatic agent, may be larger than the contents thereof in the main layer. In the case where the skin layer is not the outermost layer of the label, on the other hand, the contents of the components that are liable to cause problems when the components are present in larger amounts in the surface portion of the label, such as a dispersant, a lubricant, a plasticizer, and the flame retardant, may be smaller than the contents thereof in the main layer. The skin layer that contains a lubricant in a larger amount than the main layer may be used for enhancing the stability on forming. The skin layer may not contain a heat stabilizer (antioxidant), a light stabilizer, a dispersant, and the like. In the case where the skin layer is provided, the thickness of the skin layer is preferably 10 µm or less, and more preferably 5 µm or less.

In the case where the skin layer is provided, it is preferred from the standpoint of the convenience that the resin composition containing the materials of the main layer and the resin composition containing the materials of the skin layer are kneaded in separate extruder respectively and fed to a two-layer or three-layer co-extrusion die, and molded into a co-extruded film containing two kinds and two layers, two kinds and three layers, or three kinds and three layers. It is also preferred that after laminating the main layer and the skin layer, the layers are stretched to form the base layer (A).

Surface Layer (B)

A surface layer (B) having an internal bond strength in a range of from 0.4 to 1.5 kg·cm may be provided on the surface of the base layer (A) constituting the label opposite to the side of the adhesive layer (C).

The surface layer (B) may be provided on the base layer (A) to form a difference or a gradient in the constitution or the capability of the layers, and thereby the label can be designed to ensure the occurrence of breaking, for example, to facilitate the propagation of the breaking in the thickness direction.

In this case, the label has a structure containing the surface layer (B), the base layer (A), and the adhesive layer (C).

The surface layer (B) is laminated on one surface of the base layer (A). In this case, the film containing the base layer (A) is a laminated film formed of the base layer (A) and the surface layer (B).

The surface layer (B) is a layer that is capable of being observed from the outside after adhering to an adherend through the label. The surface layer (B) may be imparted with information, such as printed information and security information, which will be described in detail later. The surface layer (B) is broken integrally with the base layer (A) through the breaking of the base layer (A) caused by peeling the label from the adherend, and a part of the surface layer (B) remains in an unintended shape on the adherend along with a part of the base layer (A).

The breaking mechanism of the laminated film of the base layer (A) and the surface layer (B) may be estimated as follows.

When the laminated film is peeled from the label adhered to the adherend, stress concentration occurs on the surface of the base layer (A) in contact with the adhesive layer (C), and the surface on the side of the base layer (A) is broken. The breaking starting from the surface of the base layer (A) proceeds in the interior of the base layer (A) and reaches the interface between the base layer (A) and the surface layer (B).

At this time, if the surface layer (B) is not breakable, the breaking reaching the interface proceeds in the interface between the base layer (A) and the surface layer (B) to progress interface delamination. In this case, there is no change in the appearance of the label viewed in the perpendicular direction, and by adhering the base layer (A) and the surface layer (B) with an adhesive or the like, the fact that the label has been peeled cannot be recognized, which does not fit the purpose of the invention.

In the case where the surface layer (B) is breakable, on the other hand, the breaking reaching the interface causes breaking of the surface layer (B), and the breaking proceeds in the interior of the surface layer (B) and reaches the surface opposite to the starting point. Thus, the entire film is completely broken.

The expression that "the surface layer (B) is breakable" means that the internal bond strength of the surface layer (B) is 1.5 kg·cm or less. When the internal bond strength of the surface layer (B) is smaller, the surface layer (B) is more breakable. The preferred range of the internal bond strength of the surface layer (B) will be described later.

For performing the breaking of the surface layer (B) and the breaking of the entire laminated film, the tensile stress at break that is required for the breaking of the surface layer (B) on the surface in contact with the base layer (A) is preferably smaller than the tensile stress at break that is required for the breaking of the base layer (A) on the surface in contact with the surface layer (B). Specifically, the surface layer (B) preferably satisfies the relationship shown by the following expression (2):

$$\sigma_B(A) > \sigma_B(B) \tag{2}$$

wherein $\sigma_B(A)$ represents the tensile stress at break (MPa) of the base layer (A) on pulling in MD, and $\sigma_B(B)$ represents the tensile stress at break (MPa) of the surface layer (B) on pulling in MD.

In the laminated film containing the base layer (A) having the surface layer (B) on one surface thereof, the internal bond strength measured on the side of the base layer (A) (i.e., the internal bond strength of the base layer (A)) is preferably 0.4 kg·cm or more, more preferably 0.45 kg·cm or more, further preferably 0.5 kg·cm or more, and particularly preferably 0.6 kg·cm or more.

When the internal bond strength of the base layer (A) is 0.4 kg·cm or more, the label is not broken in the normal use to facilitate the adhesion operation of the label. Furthermore, the intended functions of the label, i.e., the information displaying function and the like, can be favorably exhibited.

The internal bond strength measured on the side of the base layer (A) is preferably 0.95 kg·cm or less, more preferably 0.9 kg·cm or less, further preferably 0.85 kg·cm or less, and particularly preferably 0.8 kg·cm or less.

When the internal bond strength of the base layer (A) is 0.95 kg·cm or less, the film is broken on peeling from the adherend, and a part of the film remains in an unintended shape on the adherend. The fact that the label has been peeled is capable of being recognized by the naked eye through the remaining part.

In the laminated film containing the base layer (A) having the surface layer (B) on one surface thereof, the internal bond strength measured on the side of the surface layer (B) (i.e., the internal bond strength of the surface layer (B)) is preferably 0.4 kg·cm or more, more preferably 0.45 kg·cm or more, further preferably 0.5 kg·cm or more, and particularly preferably 0.6 kg·cm or more.

When the internal bond strength of the surface layer (B) is 0.4 kg·cm or more, the label is not broken in the normal use to facilitate the adhesion operation of the label. Furthermore, the intended functions of the label, i.e., the information displaying function and the like, can be favorably exhibited.

The internal bond strength measured on the side of the surface layer (B) is preferably 1.5 kg·cm or less, more preferably 0.95 kg·cm or less, further preferably 0.9 kg·cm or less, particularly preferably 0.85 kg·cm or less, and most preferably 0.8 kg·cm or less.

When the internal bond strength of the surface layer (B) is 1.5 kg·cm or less, the breaking occurring on the side of the base material layer (A) on peeling the label from the adherend is capable of proceeding to the surface layer (B), thereby breaking both the base layer (A) and the surface layer (B), and a part thereof remains in an unintended shape on the adherend. The fact that the label has been peeled is capable of being recognized by the naked eye through the remaining part. It is particularly preferred that the internal bond strength of the surface layer (B) is smaller than the internal bond strength of the base layer (A).

The laminated film of the base layer (A) and the surface layer (B) is molded to satisfy the aforementioned conditions, and the surface layer (B) is relatively more breakable than the base layer (A). Accordingly, in the label using the laminated film, the base layer (A) and the surface layer (B) are broken integrally.

Accordingly, when the label is to be peeled from the adherend having the label, a part of the laminated film remains in an unintended shape on the adherend, and the fact that the label has been peeled is capable of being recognized by the naked eye through the remaining part. Furthermore, even if the peeled part is tried to re-adhere the original location, it is difficult to restore the original shape since the peeled part and the remaining part each have an unintended shape. Consequently, the label can be prevented from being re-adhered.

On the other hand, the base layer (A) and the surface layer (B) are necessarily not peeled easily from each other in the post processing including the after working of forming the laminated film into a label and printing or punching the laminated film, the adhesion to an adherend, and the distribution of the adherend having the label.

Accordingly, the laminated film preferably has an adhesion strength between the base layer (A) and the surface layer (B) measured according to JIS K6854-2:1999 "Adhesive—Determination of peel strength of bonded assemblies—Part 2, 180 degree peeling" of 7.7 N/15 mm or more.

When the adhesion strength is the aforementioned value or more, the base layer (A) and the surface layer (B) are difficult to be peeled from each other in the post processing. Accordingly, a label product that is obtained through the post processing of the laminated film can be produced with a high efficiency. The adhesion strength between the base layer (A) and the surface layer (B) is preferably 9 N/15 mm or more, and more preferably 11 N/15 mm or more. The upper limit of the adhesion strength is not particularly limited, and is preferably 50 N/15 mm or less, and more preferably 35 N/15 mm or less.

Material for Surface Layer (B)
Thermoplastic Resin, Inorganic Fine Powder, and Organic Filler The surface layer (B) preferably contains a thermoplastic resin and at least one of inorganic fine powder and an organic filler, as similar to the base layer (A).

Examples of the thermoplastic resin used in the surface layer (B) include the same thermoplastic resins as described for the base layer (A), and among these, a polyethylene-based resin and a polypropylene-based resin, which can be easily molded and stretched, are preferred.

Examples of the inorganic fine powder and the organic filler used in the surface layer (B) include the same inorganic fine powder and organic fillers as described for the base layer (A). The preferred ranges of the average particle diameter of the inorganic fine powder and the organic filler used in the surface layer (B) are the same as the preferred ranges of the average particle diameter of the inorganic fine powder and the organic filler used in the base layer (A). The inorganic fine powder and the organic filler used in the base layer (A) may be the same as or different from those used in the surface layer (B) and may have the same or different diameter as/from those used in the surface layer (B).

The total content of the inorganic fine powder and the organic filler in the surface layer (B) is preferably 30% by mass or more, and more preferably 35% by mass or more, based on the total amount of all the materials constituting the surface layer (B), from the standpoint of controlling the porosity of the surface layer (B) to the preferred ranges described later. The total content of the inorganic fine powder and the organic filler in the surface layer (B) is preferably 70% by mass or less, and more preferably 65% by mass or less, based on the total amount of all the materials constituting the surface layer (B), from the same standpoint.

Additional Components

The surface layer (B) may contain as additional components a heat stabilizer (antioxidant), a light stabilizer, a dispersant, a lubricant, a colorant, a nucleating agent, a plasticizer, a releasing agent, a flame retardant, an antistatic agent, an ultraviolet ray absorbent and the like, depending on necessity.

The heat stabilizer used may be one or more kinds selected from the heat stabilizers described for the base layer (A), and the heat stabilizer used in the base layer (A) may be the same as or different from the heat stabilizer used in the surface layer (B).

In the case where the surface layer (B) contains the heat stabilizer, the heat stabilizer is preferably contained in an amount of 0.001% by mass or more from the standpoint of the exhibition of the function of the heat stabilizer. The heat stabilizer is preferably contained in an amount of 1% by mass or less, more preferably 0.5% by mass or less, from the standpoint of the improvement of the forming stability and the appearance.

The light stabilizer used may be one or more kinds selected from the light stabilizers described for the base layer (A), and the light stabilizer used in the base layer (A) may be the same as or different from the light stabilizer used in the surface layer (B).

In the case where the surface layer (B) contains the light stabilizer, the light stabilizer is preferably contained in an amount of 0.001% by mass or more from the standpoint of the exhibition of the function of the light stabilizer. The light stabilizer is preferably contained in an amount of 1.% by mass or less, more preferably 0.5% by mass or less, from the standpoint of the improvement of the forming stability and the appearance.

The dispersant and the lubricant used may be one or more kinds selected from the dispersants and the lubricants described for the base layer (A), and the dispersant and the lubricant used in the base layer (A) may be the same as or different from the dispersant and the lubricant used in the surface layer (B).

In the case where the surface layer (B) contains the dispersant or the lubricant, the dispersant and the lubricant are preferably contained in an amount of 0.01% by mass or more from the standpoint of the exhibition of the function of the dispersant and the lubricant. The dispersant and the lubricant are preferably contained in an amount of 4% by mass or less, more preferably 2%; by mass or less, from the standpoint of the improvement of the forming stability and the appearance.

Examples of the colorant include carbon black, a dioxazine compound, an anthraquinone compound, a monoazo or diazo pigment, a diketopyrrolopyrrole compound, a polycyclic pigment, an anthrapyrimidine compound, a quinacridone compound, a quinophthalone compound, a perynone compound, a perylene compound, an acridine compound, an azo dye, a phthalocyanine compound, a xanthene compound, a phenazine compound, a colored metal oxide pigment, a colored metal hydroxide pigment, a metal non-stoichiometric oxide pigment, a metal sulfide pigment, a metal sulfide selenide pigment, a metal carbonate salt pigment, a chromate salt pigment, a molybdate salt pigment, a metal phthalocyanine compound, a complex pigment, a silicate salt pigment, and an effect pigment.

In the case where the surface layer (B) contains the colorant, the amount of the colorant in the surface layer (B) may be appropriately controlled to fit the target color tone of the label, and is generally preferably from 0.001 to 1.2% by mass.

Examples of the nucleating agent include a bisamide compound, a tetraoxaspiro compound, a quinacridone compound, iron oxide nanoparticles, an alkali or alkaline earth metal salt of an aliphatic or aromatic carboxylic acid, an aromatic sulfonic acid compound, a diester or triester compound of a dibasic or tribasic carboxylic acid, a phthalocyanine pigment, and a composition containing a cyclic phosphorus compound and a magnesium compound.

In the case where the surface layer (B) contains the nucleating agent, the amount thereof added is preferably controlled within a range of from 0.0001 to 5.0% by mass for making the preferred range of the porosity of the surface layer (B) described later.

Examples of the plasticizer for a polyethylene-based resin, a polypropylene-based resin and a polyolefin-based resin include a hydrocarbon compound, a phthalate ester compound and a higher alcohol compound. Examples thereof for a polyester-based resin include a phthalate ester compound and a fatty acid ester of a monohydric or dihydric or higher alcohol.

In the case where the surface layer (B) contains the plasticizer, the amount thereof added is generally preferably from 1 to 40% by mass.

Examples of the releasing agent include a fatty acid metal salt and a silicone compound, and the amount thereof added is generally preferably from 0.0001 to 5.0% by mass.

Examples of the flame retardant include an isocyanurate compound, a phosphate triester compound, a halogenated hydrocarbon compound, a halogenated bisphenol compound, and a polyphosphate salt.

In the case where the surface layer (B) contains the flame retardant, the amount thereof added is generally preferably from 0.1 to 10% by mass.

Examples of the antistatic agent include a polyether compound, a polyetheresteramide compound, an ethylene oxide-epichlorohydrin compound, a quaternary ammonium salt-containing acrylate polymer, and a polyolefin modified with an $\alpha,\beta$-unsaturated carboxylic acid or an anhydride thereof, and a metal salt thereof.

In the case where the surface layer (B) contains the antistatic agent, the amount thereof added is generally preferably from 2 to 15% by mass.

Examples of the ultraviolet ray absorbent include a benzophenone compound, a benzotriazole compound, a salicylate ester compound, and a cyanoacrylate compound.

In the case where the surface layer (B) contains the ultraviolet ray absorbent, the amount thereof added is generally preferably from 0.5 to 10% by mass.

The contents of amounts referred herein for the additional components each are the content of amount based on the total amount of all the materials constituting the surface layer (B).

Properties of Surface Layer (B)
Porosity

The porosity of the surface layer (B) is a value that is obtained by the following expression (3).

$$\text{Porosity of surface layer}(B)(\%) = \frac{\rho(B)_0 - \rho(B)}{\rho(B)_0} \times 100 \qquad (3)$$

wherein $\rho(B)_0$ represents the true density of the surface layer (B), and $\rho(B)$ represents the density of the surface layer (B).

For the measurement methods for the true density $\rho(B)_0$ of the surface layer (B) and the density $\rho(B)$ of the surface layer (B), reference may be made to the description for the measurement methods of the true density $\rho(A)_0$ of the base layer (A) and the density $\rho(A)$ of the base layer (A).

For progressing the breaking occurring in the base layer (A) to the surface layer (B), the porosity of the surface layer (B) is preferably 40% or more, more preferably 41% or more, and further preferably 42% or more. For preventing the surface layer (B) from being broken before the breaking of the label and preventing the base layer (A) and the surface layer (B) from suffering interface delamination, the porosity of the surface layer (B) is preferably 70% or less, more preferably 60% or less, further preferably 55% or less, and particularly preferably 53% or less.

Simultaneously, the porosity of the surface layer (B) preferably has a value that is higher than the porosity of the base layer (A). The gradient of the porosity provided in the thickness direction of the laminated film facilitates the propagation of the breaking occurring in the base layer (A) to the surface layer (B).

The porosity of the surface layer (B) can be controlled by the formulation of the resin composition constituting the surface layer (B), particularly the contents (total content) and the volume average particle diameters of the inorganic fine powder and the organic filler, and the stretching condition, particularly the stretching ratio and the stretching temperature.

Density

The density $\rho(B)$ of the surface layer (B) is preferably 0.68 g/cm$^3$ or more, more preferably 0.70 g/cm$^3$ or more, and further preferably 0.72 g/cm$^3$ or more, for controlling the porosity of the surface layer (B) to the preferred range. The density $\rho(B)$ of the surface layer (B) is preferably 0.85 g/cm$^3$ or less, more preferably 0.80 g/cm$^3$ or less, and further preferably 0.78 g/cm$^3$ or less, from the same standpoint.

Thickness

The thickness of the surface layer (B) is preferably 10 μm or more, more preferably 15 μm or more, and further preferably 20 μm or more, from the standpoint of the workability of the stretching of the laminated film of the base layer (A) and the surface layer (B), and the secondary processes, such as stretching and forming, application of adhesiveness, and printing, of the laminated film. The thickness thereof is preferably 50 μm or less, more preferably 45 μm or less, and further preferably 40 μm or less, from the standpoint of providing such the flexibility of the base material that the film may follow the non-planar portion, such as a curved portion and an edge portion, on adhering the label on a three-dimensional article. For the measurement method of the thickness of the surface layer (B), reference may be made to the measurement method of the thickness of the base layer (A).

Stretching of Surface Layer (B)

The surface layer (B) is preferably stretched in at least one direction, and is more preferably stretched uniaxially or biaxially, for making a porous layer, as similar to the base layer (A). For the stretching method, reference may be made to the description for the method for producing a label described later.

Laminated Structure of Surface Layer (B)

The surface layer (B) may have a laminated structure containing two or more layers in such a range that does not impair the effects of the invention. In the description herein, for the case where the surface layer (B) has an n-layer structure, the layers are expressed by a surface layer (B1), a surface layer (B2), . . . a surface layer (Bn) in this order from the base layer (A). Preferred examples of the laminated structure of the surface layer (B) will be described below.

The surface layer (B1) in contact with the base layer (A) preferably contains a thermoplastic resin that has a lower melting point than those used in the surface layers (32) to (Bn) and preferably contains a smaller amount (total content) of the inorganic fine powder and the organic filler than that in the surface layers (B2) to (Bn), from the standpoint of the enhancement of the adhesion strength to the base layer (A). For making the tensile stress at break of the surface layer (B1) smaller than those of the surface layers (B2) to (Bn), the surface layer (B1) preferably contains a thermoplastic resin that has a higher melt flow rate (MFR) than the thermoplastic resins used in the surface layers (B2) to (Bn). For enhancing the adhesion strength to the base layer (A), the inorganic fine powder and the organic filler may not be added to the surface layer (B1).

The surface layer (Bn), which may be the outermost layer of the laminated film, preferably has a content of the inorganic fine powder and the organic filler of from 25 to 55% by mass for making the surface layer (Bn) suitable for printing, and the surface layer (B1) preferably has a content of the inorganic fine powder and the organic filler of from 40 to 75% by mass for ensuring the propagation of the breaking occurring in the base layer (A) to the surface layer (B). The total content of the inorganic fine powder and the organic filler in the surface layer (Bn) is more preferably from 30 to 50% by mass, and the total content of the inorganic fine powder and the organic filler in the surface layer (B1) is more preferably from 45 to 70% by mass.

For forming the surface layer (B) that has a laminated structure, for example, such a method is preferably used that the resin compositions containing the materials of the layers are kneaded in separate extruders, and fed to a multilayer die, and the compositions are laminated in the die to form the surface layer (B) that has a laminated structure.

Additional Layer

The label may have an additional layer other than the base layer (A) and the surface layer (B) in such a range that does not excessively impair the objects and the effects of the invention. The additional layer is necessarily broken along with the breaking of the base layer (A) caused by peeling the label from an adherend, as similar to the surface layer (B). Accordingly, the additional layer preferably has an internal bond strength of from 0.4 to 1.5 kg·cm, and more preferably from 0.4 to 0.95 kg·cm. The tensile stress at break of the additional layer is preferably smaller than the tensile stress at break of the base layer (A).

Adhesive Layer (C)

The label contains the base layer (A), and an adhesive layer (C) provided in contact with one surface of the base layer (A), and the adhesive layer (C) is adhered to an adherend, so as to retain the base layer (A) on the adherend. In the invention, the base layer (A) has an internal bond strength measured according to TAPPI T569 of from 0.4 to 0.95 kg·cm on the side of the adhesive layer (C).

The adhesive layer (C) is provided in contact with one surface of the base layer (A), and has a function of adhering the base layer (A) and the laminated film containing the same to an adherend.

The material used in the adhesive layer (C) may be any of a pressure sensitive adhesive or an adhesive, and a pressure sensitive adhesive and an adhesive may be used in combination. In the description herein, the adhesive means a material having adhesiveness in the form of a glassy solid, and the pressure sensitive adhesive means a material having pressure sensitive adhesiveness in the form of a liquid or a gel.

Examples of the material that exhibits the adhesion function used include a pressure sensitive adhesive, a delayed adhesive, a hot-melt adhesive, and a remoistening adhesive, which may be used appropriately corresponding to the adherend.

Examples of the pressure sensitive adhesive include a rubber pressure sensitive adhesive, an acrylic pressure sensitive adhesive, and a silicone pressure sensitive adhesive.

Specific examples of the rubber pressure sensitive adhesive include a natural rubber, a polyisobutylene rubber, a butyl rubber, a styrene-butadiene rubber, a styrene-isoprene block copolymer, and a styrene-butadiene block copolymer, which may be used solely or as a combination of plural kinds thereof. Examples thereof also include a mixture containing the rubber pressure sensitive adhesive and a tackifier, such as rosin abietate, a terpene-phenol copolymer, and a terpene-indene copolymer.

Specific examples of the acrylic pressure sensitive adhesive include copolymers having a glass transition point of −20° C. or less, such as a 2-ethylhexyl acrylate-n-butyl acrylate copolymer and a 2-ethylhexyl acrylate-ethyl acrylate-methyl methacrylate copolymer.

Specific examples of the silicone pressure sensitive adhesive include a mixture of silicone rubber and a silicone resin.

Examples of the form of the pressure sensitive adhesive include a solvent type, an emulsion type and a hot-melt type, and in general, a solvent type or emulsion type pressure sensitive adhesive may be laminated by coating.

The delayed adhesive may be formed mainly of a thermoplastic resin, a solid plasticizer, and a tackifier. Examples of the thermoplastic resin include a (meth)acrylate ester copolymer, an ethylene-vinyl acetate copolymer, an ethylene-(meth)acrylate ester copolymer, a styrene-butadiene-styrene copolymer, and a styrene-isoprene-styrene copolymer. The thermoplastic resin may be used solely or as a combination of plural kinds thereof.

Examples of the solid plasticizer used in the delayed adhesive include diphenyl phthalate, dihexyl phthalate, dicyclohexyl phthalate, dihydroabietyl phthalate, dimethyl isophthalate, diisohexyl phthalate, sucrose benzoate, ethylene glycol dibenzoate, trimethylolethane tribenzoate, glyceryl tribenzoate, pentaerythritol tetrabenzoate, sucrose octaacetate, tricyclohexyl citrate and N-cyclohexyl-p-toluenesulfonamide. The solid plasticizer may be used solely or as a combination of plural kinds thereof.

The tackifier used in the delayed adhesive include rosin, polymerized rosin, disproportionated rosin and a derivative thereof, a polyterpene resin, a phenol-modified resin, such as a terpene-phenol resin and a rosin-phenol resin, an alkylphenol resin, a coumarone-indene resin, a xylene resin, an aliphatic hydrocarbon resin, an alicyclic saturated hydrocarbon resin, an aromatic hydrocarbon resin and a hydrogenated product thereof, a styrene resin, and a vinyltoluene-α-methylstyrene copolymer. The tackifier may be used solely or as a combination of plural kinds thereof.

The mixing ratios of the thermoplastic resin, the solid plasticizer, and the tackifier in the delayed adhesive may be approximately from 20 to 60% by mass, approximately from 20 to 60% by mass, and approximately from 20 to 60% by mass, respectively, and may be appropriately controlled depending on the adhesiveness, the storage stability and the like of the label. The delayed adhesive may further contain various additives, such as an antiseptic, a dye, an ultraviolet ray absorbent, an antioxidant, a pH modifier and a defoaming agent, in such an amount that does not impair the adhesiveness.

The hot-melt adhesive may be formed mainly of a thermoplastic resin, a tackifier, and wax. Examples of the thermoplastic resin include a thermoplastic elastomer, such as a (meth)acrylate ester copolymer, an ethylene-vinyl acetate copolymer, an ethylene-(meth)acrylate ester copolymer, a styrene-butadiene-styrene copolymer, and a styrene-isoprene-styrene copolymer, and an olefin polymer, such as an amorphous poly-α-olefin, e.g., polyethylene and polypropylene.

Examples of the tackifier used in the hot-melt adhesive include rosin, polymerized rosin, disproportionated rosin and a derivative thereof, a polyterpene resin, a phenol-modified resin, such as a terpene-phenol resin and a rosin-phenol resin, an alkylphenol resin, a coumarone-indene resin, a xylene resin, an aliphatic hydrocarbon resin, an alicyclic saturated hydrocarbon resin, an aromatic hydrocarbon resin and a hydrogenated product thereof, a styrene resin, and a vinyltoluene-α-methylstyrene copolymer. The tackifier may be used solely or as a combination of plural kinds thereof.

The hot-melt adhesive is preferably activated at a temperature of from 70 to 150° C., and more preferably from 80 to 130° C. The activation temperature herein means the peak temperature in the differential scanning calorimetry of the hot-melt adhesive. The most of the components of the adhesive layer using the hot-melt adhesive may be activated by heating to the temperature range, and thus the function of the label of the invention having the adhesive layer using the hot-melt adhesive may be appropriately exhibited. The activation temperature of the hot-melt adhesive may be controlled by the kind and the amount of the tackifier added.

Examples of the remoistening adhesive include glue, gum arabic, traganth gum, various kinds of starch, such as oxidized starch, esterified starch and etherified starch, dextrin, polyvinyl alcohol, a polyvinyl ether compound, such as polyvinyl methyl ether, polyvinyl ethyl ether and polyvinyl isobutyl ether, polyvinylpyrrolidone, a cellulose derivative, such as methyl cellulose, carboxymethyl cellulose, hydroxyethyl cellulose, ethylhydroxyethyl cellulose and viscose, polyethylene glycol, polyethylene oxide, casein, gelatin, sodium alginate. Among these, polyvinyl alcohol is preferred from the standpoint of the storage stability under humidified condition, and the adhesiveness.

The saponification degree of the polyvinyl alcohol used as the remoistening adhesive may be from 70 to 99%, and preferably from 70 to 85%. When the saponification degree is less than 70%, the storage stability under humidified condition may be deteriorated, and blocking tends to occur. When the saponification degree exceeds 99%, the remoistening adhesive may be insufficiently activated even though the adhesive is applied with water, and a large pressure may be required for adhesion.

The remoistening adhesive may contain, for example, an inorganic pigment, such as a carbonate salt, an oxide, a hydroxide, a sulfate salt and the like of aluminum, zinc, calcium, magnesium, barium, titanium and the like, an antiblocking agent, such as starch, a styrene-based resin, a polyolefin-based resin, a melamine resin, an acrylic resin, paraffin, natural wax and synthetic wax, and depending on necessity various additives, such as a film hardener, an antiseptic, an ultraviolet ray absorbent, an antioxidant, a pH modifier and a defoaming agent, in such a range that does not impair the adhesiveness.

Release Material (D)

The label may have a release material (D) laminated on the surface thereof on the side of the adhesive layer (C) for facilitating the handleability thereof before adhering on an adherend.

Examples of the release material (D) include materials that have been ordinarily used as release paper, such as wood-free paper or craft paper without treatment, these kinds of paper having been subjected to a calender treatment, a resin coating treatment or a film lamination treatment, and glassine paper, coated paper or a plastic film having been subjected to a silicone treatment. Among these, a material having been subjected to a silicone treatment on the surface thereof in contact with the adhesive layer (C).

In the case where the delayed adhesive or the hot-melt adhesive, which are activated with heat, or the remoistening adhesive is used in the adhesive layer (C), the layer generally does not exhibit pressure sensitive adhesiveness under storing, and thus the release material (D) is generally not provided.

Properties of Label

When the label is peeled from an adherend, the label does not damage the adherend, and the label itself is broken through all the layers thereof without interlayer delamination of the film including the base layer (A). Accordingly, the label preferably satisfies the following relationship of the internal strength α of the film, the adhesion strength β between the film and the adhesive layer (C), the adhesion strength γ between the adhesive layer (C) and the adherend, and the adhesion strength δ between the adhesive layer (C) and a release material (D).

$$\beta \geq \gamma > \alpha > \delta$$

Due to the relationship of β>α, on peeling the film from the adherend, the film is broken, and a part of the film remains in an unintended shape on the adherend. Due to the relationship of γ>α, a part of the film may remain on the adherend. Due to the relationship of β≥γ, on peeling the label, it may be expected that the breaking of the film is facilitated through concentration of the stress to the surface of the film facing the adherend. Due to the relationship of β>δ, the adhesive may not remain on the release material (ID) on peeling the label from the release material (D), as similar to an ordinary label.

In the relationship, α is the internal bond strength of the film described above. In the invention, the internal bond strength of the base layer (A) constituting the film can be assumed to be the internal bond strength of the film herein since the base layer (A) has a small internal bond strength. β, γ and δ are the adhesion strengths that are measured according to JIS K6854-2:1999.

The adhesion strengths β and γ may be controlled by the kind of the adhesive and the cohesive force of the adhesive used in the adhesive layer (C). The adhesion strength β may be controlled by providing an anchor layer on the film, or providing irregularity on the surface of the film by embossing the film. The adhesion strengths γ and δ may be controlled by forming the adhesive layer (C) to have a patterned shape or a discontinuous structure, or providing irregularity on the surface of the adhesive layer (C) by embossing the adhesive layer (C) after forming. The adhesion strength δ may be controlled by the kind of the releasing agent provided on the surface of the release material (D), the coating method of the releasing agent, and the like. Among the adhesives shown above, a strong pressure sensitive adhesive is preferred for the aforementioned relationship.

In the case where there is a concern of interfacial delamination between the base layer (A) and the adhesive layer (C)

due to a too small adhesion strength between them, an anchor coating agent is preferably coated on the surface of the base layer (A) before providing the adhesive layer (C). Examples of the anchor coating agent used include a polyurethane resin, a polyisocyanate-polyether polyol resin, a polyisocyanate-polyester polyol-polyethyleneimine resin and an alkyl titanate, which may be generally used after dissolving in an organic solvent, such as methanol, ethyl acetate, toluene and hexane, or water. The amount of the anchor coating agent coated on the film is generally from 0.01 to 5 g/m$^2$, and preferably from 0.02 to 2 g/m$^2$, in terms of solid content after coating and drying.

Breaking Start Part of Film

The label preferably has a Breaking start part of the film for facilitating the start of breaking of the film including the base layer (A) on peeling the label from the adherend having the label. The breaking start part of the film may facilitate the start of breaking of the film by concentrating the stress to the particular part of the film on peeling the film.

Some specific examples of the measure for starting breaking of the film will be described below.

(1) Discontinuous Adhesive Layer (C)

By forming the adhesive layer (C) of the label that is not uniform in the plane direction but is formed discontinuously, a part where the stress is concentrated is formed at the discontinuous point or the discontinuous line on peeling the label from the adherend having the label. Examples of the adhesive layer (C) that is formed discontinuously include an embodiment where the adhesive layer (C) is coated to have a patterned shape, and an embodiment where two adhesive layers (C) different in adhesion force are formed adjacently to each other. Examples of the patterned shape include a dot pattern, a checkered pattern and a stripe pattern, and in the pattern, one region formed of the adhesive may be in contact with the adjacent region, but is preferably not in contact with the adjacent region. For facilitating the start of the breaking of the film, the pattern may be formed to include a pattern containing plural lines perpendicular to the direction in that the label is assumed to be peeled from the adherend having the label.

(2) Adhesion Inhibiting Part

The adhesion inhibiting part herein is a non-adhesive part that is formed by coating a paint containing a silicone or the like on the surface of the film in contact with the adhesive layer (C) or the surface of the label on the side of the adhesive layer (C).

The adhesion inhibiting part may be provided between the film and the adhesive layer (C) and may be provided between the adhesive layer (C) and the adherend. By forming the adhesion inhibiting part discontinuously, the same effect as in the case where the discontinuous adhesive layer is provided. In this case, when the adhesion inhibiting part is provided to include a pattern containing plural lines perpendicular to the direction in that the label is assumed to be peeled from the adherend having the label, the stress is concentrated to the film at the position where the line is transferred from the adhesion inhibiting part to the part having no adhesion inhibiting part.

(3) Adhesive Layer (C) Having Emboss

In the case where the adhesive layer (C) of the label has a steep change in thickness, a part where the stress is concentrated locally in the thin portion of the film is formed on peeling the label from the adherend having the label. The change in the thickness direction of the adhesive layer (C) may be formed by coating the adhesive to have an emboss shape or by embossing the adhesive layer (C).

The emboss shape preferably has a thickness ratio of the part having a relatively thin adhesive layer (C) (groove part) and the part having a relatively thick adhesive layer (C) (land part), i.e., (groove part)/(land part), of from 0.25/1 to 0.5/1. The slope of the leading edge (taper) of the land part is preferably steep from the standpoint of facilitating the stress concentration.

The emboss shape may be provided on the surface of the film that is in contact with the adhesive layer (C) or may be provided on the surface of the adhesive layer (C) after providing the adhesive layer (C) on the film.

(4) Half Cut Line

The half cut line herein is a cut line formed by cutting the film in the thickness direction to such an extent that the film itself is not cut out.

By providing the half cut line in the film, the stress is concentrated at the end point of the half cut line on peeling the label from the adherend having the label. The half cut line provided may reduce the tensile strength of the film, and thus the size (length and depth) of the half cut line is preferably as small as possible. The half cut line may be provided any surface of the film, and is preferably provided on the surface of the film that is in contact with the adhesive layer (C), from the standpoint that the shape of the peeled surface is made complicated for the difficulty in re-adhesion of the peeled label.

Printed Information

The label may have printed information on the surface of the film for the purpose of providing information to the users in the state where the label is adhered to an adherend, as similar to the ordinary label. In the case where the film is a laminated film, the printed information may be provided not only on the surface on the side of the surface layer (B) but also on the surface on the side of the base layer (A).

Examples of the printed information include a logo mark, a trade name, a company name, an expiration date, a cautionary statement, a design, such as a character, a bar code, and a pattern.

The information may be printed on the film before forming the label or may be printed on the label after laminating the adhesive layer (C) and depending on necessity the release material (D) on the film.

Examples of the printing method include known printing methods, such as offset printing, relief printing, gravure printing, flexographic printing, letterpress printing, ink-jet printing, heat sensitive recording, thermal transfer recording, and electrophotographic recording.

The film used in the label may have an ink receiving layer provided in advance or may be subjected to a surface oxidation treatment, such as a corona discharge treatment and an atmospheric plasma treatment, on the surface thereof that is to be printed.

Security Element

The label of the invention may be used as a security label by utilizing the nature thereof, i.e., breaking of the film on peeling, and one or more security element may be further added to the label for further enhancing the security. The security element may be provided in such a manner that the function thereof is not changed before and after the breaking of the label, or the function thereof is terminated at the moment when the label is broken.

(1) Antenna

In the case where an antenna for an RFID tag or an IC tag is provided in the label, the label may be designed in such a manner that the label exhibits the function of RFID or the like before the breaking of the label, whereas the function is terminated by breaking the antenna or breaking the contact point between the antenna and the chip at the moment when the label is broken.

A conductor line may be disposed to a particular shape for providing an antenna on the label, and for breaking the antenna securely associated with the breaking of the label, a more flexible antenna is preferably formed by printing a circuit pattern with a conductive ink.

While the position where the antenna is provided on the label may be any surface of the film. In the case where the antenna is provided on the surface of the film that is not in contact with the adhesive layer (C), the presence of the antenna is preferably hidden by further providing a masking layer on the surface of the label. In the case where the antenna is provided on the surface of the film that is in contact with the adhesive layer (C), the antenna is preferably provided with a device for preventing short circuit from occurring, such as a protective layer.

(2) Hologram

In the case where a hologram is provided on the label, not only the hologram exhibits the security function by itself, but also the recognition of the fact that the label has been peeled is facilitated through the change of the appearance of the hologram associated with the deformation of the film due to the breaking of the label. Accordingly, a hologram may be formed in such a range that does not impair the function of breaking.

A hologram generally has a hologram forming layer and a reflective thin film layer in this order from the observation side, and may be formed by pressing a metal form plate having a hologram image formed thereon onto the hologram forming layer.

Examples of a resin that is suitable for the hologram forming layer include a thermoplastic resin, such as an acrylic resin, a vinyl chloride resin, a vinyl chloride-vinyl acetate copolymer resin, a cellulose resin, a chlorinated propylene resin, a polycarbonate-based resin and a polystyrene-based resin, an ultraviolet ray-curable resin, and a thermosetting resin, such as an unsaturated polyester-based resin, a melamine resin, an epoxy resin, an acrylic melamine resin and a urea resin.

Examples of the reflective thin film layer include thin films having a thickness of from 50 to 500 nm formed by vapor deposition of a metal, such as aluminum, gold, silver and tin.

Examples of the mode of the hologram include a relief hologram, a Fresnel hologram, a Fraunhofer hologram, a lens-less Fourier transformation hologram, an image hologram and a rainbow hologram, and the read light used may be any of laser light and white light.

In the case where a hologram is applied to the label, it is preferred that the hologram is formed on a sheet in advance, and then the sheet is attached to the film, rather than the formation of the hologram directly to the film, since the surface smoothness of the film is not sufficiently high for providing the hologram directly on the surface of the film.

(3) Digital Code

A digital code may be provided in such a manner that the digital code is cut out on peeling the label, and thereby the digital code cannot be read.

The digital code used include known ones, such as a character string, a numerical string, a one-dimensional bar code and a two-dimensional bar code, which may be used solely or as a combination thereof. The digital code referred herein is one that is optically readable, and is generally provided on the surface of the label that is not in contact with the adhesive layer (C).

The digital code may be provided in such a manner that the digital code is not cut out, but half cut lines are provided to surround the digital code, and thereby the digital code remains on the adherend on the breaking of the label.

The digital code may be provided by various printing methods, and may be provided in a rewritable manner by reversible heat sensitive printing.

(4) Fluorescent Material

The security of the label, such as an anti-counterfeit property, can be further enhanced by using a special material, such as a fluorescent material.

Any fluorescent material may be used that contains a substance that is excited with excitation light and emits light (fluorescent light or phosphorescent light) having a different wavelength from the excitation light, and is capable of coloring any of the layers of the film constituting the label.

Examples of the material that is excited with ultraviolet ray or visible light and emits visible light include an inorganic fluorescent pigment containing crystals of an oxide, a sulfide, a silicate salt, a phosphate salt, a tungstate salt of the like of Ca, Ba, Mg, Zn, Cd or the like, doped with a metal element, such as Mn, Zn, Ag, Cu, Sb and Pb, or a rare earth element, such as a lanthanoid; and an organic fluorescent dye and an organic fluorescent pigment, such as a diaminostilbenedisulfonic acid derivative, an imidazole derivative, a benzoimidazole derivative, a coumarin derivative, an aminocoumarin derivative, a triazole derivative, a carbazole derivative, a pyridine derivative, a naphthalic acid derivative, an imidazolone derivative, a benzoxazole derivative, a stylylbenzoxazole derivative, a pyrene derivative, a pyrazoline derivative, fluorescein, thioflavine, cliorescein and eosin.

Examples of the coloration method of the film include a method of mixing a fluorescent material directly with the film material to form a resin composition, which is then formed into a film; a method of forming a master batch containing a fluorescent material, and mixing the master batch with the film material to form a resin composition, which is then formed into a film; and a method of mixing a fluorescent material with a pigment, a vehicle and the like to form a fluorescent ink, which is then printed on the surface of the film by such a method as silk screen printing, offset printing, flexographic printing, gravure printing and ink-jet printing, but the invention is not limited to these methods.

In the fluorescent materials, a fluorescent material that does not exhibit color under irradiation with a visible ray is preferably used from the standpoint of counterfeit prevention. Examples thereof include a method of using a material that is excited with an infrared ray and emits an infrared ray. Examples of the material include IRS-L (produced by Nemoto Co., Ltd.), SG-YS (produced by Nemoto & Co., Ltd.) and IR900 (produced by Nemoto & Co., Ltd.).

Two kinds of fluorescent materials emitting light in different colors are preferably used in combination. Specific examples thereof include a method of printing with inks of four colors, which include fluorescent inks of three primary colors emitting light in R, G and B that are colorless and unrecognizable under ordinary light, and in addition an ultraviolet ray absorbing ink that looks colorless or white under ordinary light for suppressing extra light from being emitted through additive color mixing (see, for example, JP-A-10-297075).

Method for Producing Label

The method for producing a label will be described. The method for producing a label includes a first production method and a second production method.

First Production Method

The first production method of the label will be described.

The first production method is a method for producing a label, containing a adhesive layer forming step of providing an adhesive layer (C) on a film containing a base layer (A) on the side of the base layer (A), and a laminating step of laminating a release material (D) on the adhesive layer (C).

The steps will be described in detail below, and the production steps of the film containing the base layer (A) and the laminated film containing the base layer (A) and the surface layer (B) used in the adhesive layer forming step will be described respectively. Subsequently, the adhesive layer forming step and the laminating step will be described.

(1) Production Step of Film Containing Base Layer (A)

(1-1) Forming Step of Unstretched Film

In this step, a resin composition containing the components as materials for the base layer (A) is prepared, and molded into a sheet, thereby providing an unstretched film.

For the materials and the contents thereof of the base layer (A), reference may be made to the material containing the thermoplastic resin and at least one of the inorganic fine powder and the organic filler, and the contents thereof described for the base layer (A) above.

The method of forming the film into a sheet is not particularly limited, and various known methods may be used. Specific examples of the method include a cast forming method, in which a molten resin is extruded into a sheet through a single layer or multilayer T-die or I-die connected to a screw extruder, an inflation forming method, in which a molten resin is extruded into a tube form through a circular die, and the tube is inflated with an air pressure thereinside, a calender forming method or a roll forming method, in which a mixed material is rolled with plural heat rolls into a sheet, and a press forming method. Among these, a cast forming method using a T-die is preferred.

In the case where the film containing a main layer having provided on one surface thereof a skin layer is produced, the resin composition containing materials for the main layer and the resin composition containing materials for the skin layer are supplied to a two-layer T-die from separate extruders, and the compositions are laminated in the die, and extruded into a sheet containing two kinds and two layer, thereby providing an unstretched film containing the main layer and the skin layer. In the case where skin layers are provided on both surfaces of a main layer, the compositions are similarly extruded into a sheet containing two kinds and three layers or three kinds and three layers, thereby providing an unstretched film containing the main layer and the skin layers provided on both surface thereof.

(1-2) Stretching Step of Unstretched Film

In this step, the unstretched film obtained in the step (1-1) is stretched to provide a stretched film. By performing the step, the porosity of the film can be controlled to from 30 to 70%, and the internal bond strength can be controlled to the desired range.

Examples of the stretching method in the case where the unstretched film obtained by the cast forming method is stretched include longitudinal stretching utilizing a difference in circumferential velocity of a group of rolls, transverse stretching utilizing a tenter oven, rolling, simultaneous biaxially stretching utilizing a combination of a tenter oven and a linear motor, and simultaneous biaxially stretching utilizing a combination of a tenter oven and a pantograph. Examples of the stretching method also include simultaneous biaxially stretching utilizing an inflation forming method. The stretching directions of the stretching methods each may not be in parallel or perpendicular to the MD (i.e., the running direction of the film production apparatus).

The stretching ratio is not particularly limited, and may be appropriately determined in consideration of the characteristics of the thermoplastic resin used as the material of the film, and the like. For example, in the case where a propylene homopolymer or copolymer is used as the thermoplastic resin, and stretched uniaxially, the stretching ratio is preferably approximately from 1.2 to 12 times, and more preferably from 2 to 10 times, and in the case where the same resin is used and stretched biaxially, the stretching ratio is preferably from 1.5 to 60 times, and more preferably from 4 to 50 times, in terms of area ratio, which is the product of the stretching ratios for the stretching axes. In the case where the other thermoplastic resins are used, and stretched uniaxially, the stretching ratio is preferably approximately from 1.2 to 10 times, and more preferably from 2 to 5 times, and in the case where the same resins are used and stretched biaxially, the stretching ratio is preferably from 1.5 to 20 times, and more preferably from 4 to 12 times, in terms of area ratio.

The resulting film preferably has a porosity of from 30 to 70% shown by the expression (1). The film having such a porosity can be obtained, for example, in such a manner that the resin composition containing the thermoplastic resin and from 20 to 30% by mass in total of the inorganic fine powder and the organic filler is extruded from a T-die to provide an unstretched film, which is then stretched in the longitudinal direction (MD) at a ratio of from 3 to 6 and stretched in the transverse direction (TD) at a ratio of from 5 to 9. As another example, the film can be obtained in such a manner that the resin composition containing the thermoplastic resin and from 40 to 70% by mass in total of the inorganic fine powder and the organic filler is extruded from a T-die to provide an unstretched film, which is then biaxially stretched in the MD at a ratio of from 2 to 3.5 and in the TD at a ratio of from 2 to 3.5, or uniaxially stretched in one of the longitudinal direction or the transverse direction at a ratio of from 4 to 8.

The temperature in the stretching operation may be a known preferred temperature range for the thermoplastic resin used that is the glass transition temperature of the thermoplastic resin or more and the melting point of the crystalline portion thereof or less. Specifically, in the case where the thermoplastic resin is a polypropylene homopolymer (melting point: 155 to 167° C.), the stretching temperature may be from 100 to 164° C., and in the case where the thermoplastic resin is a high density polyethylene resin (melting point: 121 to 134° C.), the stretching temperature may be a temperature that is lower than the melting point by from 1 to 70° C. within a range of from 70 to 133° C. In the case of polyethylene terephthalate (melting point: 246 to 252° C.), such a temperature that may not progress crystallization quickly may be selected. The line speed on stretching is preferably from 20 to 350 m/min.

(2) Production Step of Laminated Film Containing Base Layer (A) and Surface Layer (B)

(2-1) Forming Step of Unstretched Laminated Film

In this step, a resin composition (A) containing materials for the base layer (A) and a resin composition (B) containing materials of the surface layer (B) are prepared. The resin compositions are molded into sheets and laminated, thereby providing an unstretched laminated film, or the resin compositions are laminated and molded into a sheet, thereby providing an unstretched laminated film.

For the materials and the contents thereof of the base layer (A) and the surface layer (B), reference may be made to the materials and the contents thereof described for the base layer (A) and the surface layer (B) above.

The method of forming the resin composition (A) and the resin composition (B) into a sheet is not particularly limited, and various known methods may be used. Specific examples of the method include a cast forming method, in which a molten resin is extruded into a sheet through a single layer to multilayer T-die or I-die connected to a screw extruder, an inflation forming method, in which a molten resin is extruded into a tube form through a circular die, and the tube is inflated with an air pressure thereinside, and a calender forming method or a roll forming method, in which a mixed material is rolled with plural heat rolls into a sheet. Among these, a cast forming method using a T-die is preferred.

The lamination method of the base layer (A) and the surface layer (B) is not particularly limited, and various known methods may be used. Specific examples of the method include a co-extrusion method, in which compositions are laminated and co-extruded through a multilayer die using multiple extruders and a feed block or multiple manifolds, an extrusion lamination method using plural extruders and plural dies, and a combination of a co-extrusion method and an extrusion lamination method.

The step of laminating the base layer (A) and the surface layer (B) may be performed by a co-extrusion method or an extrusion lamination method before the stretching step described later, or may be performed an extrusion lamination method after the stretching step described later.

(2-2) Stretching Step of Unstretched Film

In this step, the unstretched laminated film obtained in the step (2-1) is stretched to provide a stretched film containing the base layer (A) and the surface layer (B). In this step, from the standpoint that the porosities of the base layer (A) and the surface layer (B) can be controlled to the aforementioned preferred ranges, and the internal bond strengths and the tensile stresses at break are controlled to the desired ranges, the laminated film is preferably stretched in at least one direction, as similar to the aforementioned film containing the base layer (A).

Examples of the stretching method in the case where the unstretched laminated film obtained by the cast forming method is stretched include longitudinal stretching utilizing a difference in circumferential velocity of a group of rolls, transverse stretching utilizing a tenter oven, rolling, simultaneous biaxially stretching utilizing a combination of a tenter oven and a linear motor, and simultaneous biaxially stretching utilizing a combination of a tenter oven and a pantograph. Examples of the stretching method also include simultaneous biaxially stretching utilizing an inflation forming method. The stretching directions of the stretching methods each may not be in parallel or perpendicular to the MD (i.e., the running direction of the film production apparatus).

The stretching ratio is not particularly limited, and may be appropriately determined in consideration of the characteristics of the thermoplastic resin used as the material of the laminated film, and the like. For example, in the case where a propylene homopolymer or copolymer is used as the thermoplastic resin, and stretched uniaxially, the stretching ratio is preferably approximately from 1.2 to 12 times, and more preferably from 2 to 10 times, and in the case where the same resin is used and stretched biaxially, the stretching ratio is preferably from 1.5 to 60 times, and more preferably from 4 to 50 times, in terms of area ratio, which is the product of the stretching ratios for the stretching axes. In the case where the other thermoplastic resins are used, and stretched uniaxially, the stretching ratio is preferably approximately from 1.2 to 10 times, and more preferably from 2 to 5 times, and in the case where the same resins are used and stretched biaxially, the stretching ratio is preferably from 1.5 to 20 times, and more preferably from 4 to 12 times, in terms of area ratio.

In the stretching step of the unstretched laminated film in the item (2-2) above, while the case using the unstretched film containing the base layer (A) and the surface layer (B) having been laminated in advance (i.e., the unstretched laminated film) is exemplified, the base layer (A) and the surface layer (B) before the lamination each may be stretched and then laminated on each other, and the base layer (A) and the surface layer (B) may be stretched before and after the lamination. In the case where the base layer (A) and the surface layer (B) before the lamination are stretched, only one layer thereof may be stretched, and both the unstretched films may be stretched. Furthermore, such a method may be used that only one layer of the base layer (A) and the surface layer (B) before the lamination is stretched, then the layers are laminated, and then the laminated film is further stretched.

The numbers of axes of stretching for the base layer (A) and the surface layer (B) are not particularly limited, and from the standpoint that on peeling the label from the adherend having the label, a cross section having a complex shape is formed to make the re-adhesion difficult, it is particularly preferred that the base layer (A) is biaxially stretched, and the surface layer (B) is uniaxially stretched.

In the resulting laminated film, the base layer (A) preferably has a porosity of from 30 to 70% shown by the expression (1), and the surface layer (B) preferably has a porosity of from 40 to 70% shown by the expression (3). The porosity of the surface layer (B) is preferably larger than the porosity of the base layer (A). The laminated film having such porosities can be obtained, for example, in such a manner that the resin composition (A) for the base layer (A) containing the thermoplastic resin and from 20 to 25% by mass in total of the inorganic fine powder and the organic filler is extruded from a T-die to provide an unstretched film, which is then stretched in the longitudinal direction at a ratio of from 3 to 6 to provide a longitudinally stretched film, then the resin composition (B) for the surface layer (B) containing the thermoplastic resin and from 50 to 55% by mass in total of the inorganic fine powder and the organic filler is extruded from another T-die, and laminated on one surface of the longitudinally stretched film by an extrusion lamination method, and the resulting laminated sheet is then stretched in the transverse direction at a ratio of from 5 to 9. As another example, the laminated film can be obtained in such a manner that the resin composition (A) for the base layer (A) containing the thermoplastic resin and from 50 to 70% by mass in total of the inorganic fine powder and the organic filler, and the resin composition (B) for the surface layer (B) containing the thermoplastic resin and from 40 to 60% by mass in total of the inorganic fine powder and the organic filler are extruded by separate extruders respectively, supplied to a two-layer T-die, laminated in the die, and co-extruded from the T-die, so as to provide an unstretched laminated film, which is then biaxially stretched in the longitudinal direction at a ratio of from 2 to 3.5 and in the transverse direction at a ratio of from 2 to 3.5, or uniaxially stretched in any one direction of the longitudinal direction and the transverse direction at a ratio of from 4 to 8.

The temperature in the stretching operation may be a known preferred temperature range for the thermoplastic resin used that is the glass transition temperature of the thermoplastic resin or more and the melting point of the crystalline portion thereof or less. Specifically, in the case where the thermoplastic resin is a polypropylene homopolymer (melting point: 155 to 167° C.), the stretching temperature may be from 100 to 164° C., and in the case where the thermoplastic resin is a high density polyethylene resin (melting point: 121 to 134° C.), the stretching temperature may be a temperature that is lower than the melting point by from 1 to 70° C. within a range of from 70 to 133° C. In the case of polyethylene terephthalate (melting point: 246 to 252° C.), such a temperature that may not progress crystallization quickly may be selected. The line speed on stretching is preferably from 20 to 350 m/min.

(3) Forming Step of Adhesive Layer

In this step, the adhesive layer (C) is provided on one surface of the film formed of the base layer (A) obtained in the production step of the film in the item (1) above, or the adhesive layer (C) is provided on one surface of the laminated film obtained in the production step of the laminated film in the item (2) above on the side of the base layer (A), thereby providing a label. The step may be performed in the following manners corresponding to the materials used in the adhesive layer (C).

Method for Providing Pressure Sensitive Adhesive Layer or Remoistening Adhesive Layer For providing a pressure sensitive adhesive layer or a remoistening adhesive layer as the adhesive layer (C), a solvent type or emulsion type coating composition may be prepared and coated directly on the film or the laminated film.

The coating operation may be performed by kiss coating, flexographic coating, screen coating, bar coating, comma coating, knife coating, roll coating, curtain coating, gravure coating, reverse coating, reverse gravure coating and the like, and depending on necessity a drying step may be performed, thereby providing the adhesive layer (C).

In the case where the adhesive layer (C) is formed discontinuously by coating the pressure sensitive adhesive layer or the remoistening adhesive layer in the form of pattern, gravure coating, flexographic coating, screen coating and the like are preferred.

In the case where irregularity is provided on the surface of the adhesive layer (C), examples of the method used include a method of pressing a release material (D) having an emboss shape formed in advance, onto the surface of the adhesive layer (C) under pressure, thereby transferring the emboss shape to the surface of the adhesive layer (C).

Method for Providing Delayed Adhesive Layer or Hot-Melt Adhesive Layer

In the case where a delayed adhesive layer or a hot-melt adhesive layer is provided as the adhesive layer (C), a solvent type or emulsion type coating composition may be provided and coated on the film or the laminated film, and depending on necessity the coated layer may be dried and solidified at a temperature that is lower than the activation temperature of the adhesive, thereby forming the adhesive layer (C).

In the case where the adhesive layer (C) is formed discontinuously by coating the adhesive layer (C) in the form of pattern, gravure coating, flexographic coating, screen coating and the like are preferred.

In the case where irregularity is provided on the surface of the adhesive layer (C), examples of the method used include a method of forming an emboss shape by pressing an emboss roll or the like directly onto the adhesive layer (C) at a temperature in a range of from the activation temperature of the adhesive+5° C. to the activation temperature−15° C., and then the adhesive layer is cooled to room temperature.

(4) Laminating Step

In this step, a release material (D) is laminated on the adhesive layer (C) of the label obtained in the aforementioned adhesive layer forming step, thereby producing the label.

The release material (D) used herein may be the release materials (D) described for the release material (D) above.

According to the procedures, the label having a layer structure (base layer (A))/(adhesive layer (C))/(release material (D)) or the label having a layer structure (surface layer (B))/(base layer (A))/(adhesive layer (C))/(release material (D)) may be easily produced.

Second Production Method

The second production method of the label will be described.

The second production method is a method for producing a label, containing an adhesive layer forming step of providing an adhesive layer (C) on a release material (D), and a laminating step of laminating a film containing a base layer (A) or a laminated film containing a base layer (A) and a surface layer (B) on the adhesive layer (C). In the description, the method for producing a label in this manner may be referred to as an indirect method in some cases. The steps of the production method will be described below.

(5) Production Step of Film

The film containing the base layer (A) is produced in the same manner as in the step (1), or the laminated film containing the base layer (A) and the surface layer (B) is produced in the same manner as in the step (2).

(6) Forming Step of Adhesive Layer

In this step, the adhesive layer (C) is provided on a release material (D), thereby producing a release material (D) having the adhesive layer (C).

The release material (D) used herein may be the release material (D), thereby providing the release material (D) having the adhesive layer (C).

The release material (D) used herein may be the release materials (D) described for the label above. For the method for forming the adhesive layer (C), reference may be made to the description for the forming step of the adhesive layer (C) in the step (3).

In the second production method, an emboss shape may be provided on the surface of the adhesive layer (C) by coating the paint of the adhesive on the release material (D) having been applied with an emboss shape in advance, and drying and solidifying the adhesive.

(7) Laminating Step

In this step, one surface of the film containing the base layer (A) provided in the film production step of the step (5) or the surface of the laminated film containing the base layer (A) and the surface layer (B) on the side of the base layer (A) is laminated on and made in contact with the adhesive layer (C) formed in the step (6), thereby providing the label.

According to the procedures, the label having a layer structure (base layer (A))/(adhesive layer (C))/(release material (D)) or the label having a layer structure (surface layer (B))/(base layer (A))/(adhesive layer (C))/(release material (D)) may be easily produced.

Method for Using Label

The method for using the label contains adhering the label to an adherend to provide the adherend having the label, and then breaking the film constituting the label while peeling the label from the adherend.

For example, in the case where the adherend is a package, the label may be adhered to the sealing part of the package. In this case, the label may be used in such a manner that the label is peeled from the sealing part of the package simultaneously with the open of the sealing part, and the label is broken on peeling the label.

The adhering operation of the label to the package may be performed by the hand or by using a labeling machine.

The label used in the invention may have a structure that has a release material (D) or a structure that does not have a release material (D). The label may be in the form of a flat piece or may be in the form of a tape. In the case of the tape, a release material (D) in the form of a tape may be used as a back sheet, and plural labels having been punched may be mounted independently on the release material (D). Furthermore, by using a labeling machine having a punching mechanism, the label in the form of a tape having the back sheet (release material (D)) may be continuously subjected to punching of the label, picking up of the label from the base sheet, and adhesion of the label to an adherend, or the label in the form of a tape having no back sheet may be continuously cut and adhered to an adherend.

In the case of the usage pattern where the adherend is a package, and the label is broken on opening the package, such a mechanism may be provided that the label is broken by applying a stress to the film of the label on opening the package, or such a mechanism may also be provided that the film of the label is broken by pulling the label for peeling the label from the package.

In the case where the package is formed of a material having a low internal bond strength, such as a corrugated fiberboard, if the label is adhered with an adhesive having a large adhesion force, the package material may be damaged on opening the package, and there may be cases where the entire label having a part of the package material adhered thereon is peeled. If the adhesion force of the adhesive is lowered for addressing the issue, then the label may be easily released off from the adherend (easy peeling property). Accordingly, in the case where the adherend has a low internal bond strength, it is preferred that the internal bond strength of the film used in the label is controlled to a range of from 0.95 kg·cm or less, and simultaneously the adhesion force of the adhesive layer (C) is controlled to satisfy the aforementioned relationship, $\beta \geq \gamma > \alpha > \delta$. In addition, it is further preferred that any of the Breaking start parts of the film is provided.

Adherend Having Label

The adherend having a label contains the label and an adherend having the label adhered thereto.

The material of the adherend is not particularly limited, and may be an adherend having a dense and homogeneous structure, such as a plastic film and a metal plate, or an adherend having a loose and heterogeneous structure, such as paper, a paper board, a corrugated fiberboard, a woven fabric, a nonwoven fabric and wood. The shape of the surface of the adherend, on which the label is adhered, is not particularly limited, and may be a flat surface or a non-flat surface, such as a curved surface and an edge portion. The label of the invention may exhibit the advantageous effects even adhered on any of the surfaces of the adherends.

Embodiments Disclosed in Description Herein

As described above, the description herein also discloses the following embodiments.

[1] A laminated film containing at least a base layer (A) and a surface layer (B), the base layer (A) and the surface layer (B) having tensile stresses at break measured according to JIS K7161:1994 that satisfy the following expression (2), and an adhesion strength between the base layer (A) and the surface layer (B) measured according to JIS K6854-2:1999 being 7.7 N/15 mm or more:

$$\sigma_B(A) > \sigma_B(B) \tag{2}$$

wherein $\sigma_B(A)$ represents the tensile stress at break (MPa) of the base layer (A) on pulling in MD, and $\sigma_B(B)$ represents the tensile stress at break (MPa) of the surface layer (B) on pulling in MD.

[2] The laminated film according to [1], wherein the base layer (A) has a porosity shown by the following expression (1) of from 30 to 60%:

$$\text{Porosity of base layer}(A)(\%) = \frac{\rho(A)_0 - \rho(A)}{\rho(A)_0} \times 100 \tag{1}$$

wherein $\rho(A)_0$ represents a true density of the base layer (A), and $\rho(A)$ represents a density of the base layer (A).

[3] The laminated film according to [1] or [2], wherein the base layer (A) contains at least one thermoplastic resin selected from the group consisting of a polyethylene-based resin, a polypropylene-based resin, a polyolefin-based resin, a polyamide-based resin, a thermoplastic polyester-based resin, polycarbonate, and a polystyrene-based resin.

[4] The laminated film according to any one of [1] to [3], wherein the base layer (A) further contains at least one of inorganic fine powder and an organic filler.

[5] The laminated film according to any one of [1] to [4], wherein the base layer (A) is stretched in at least one direction.

[6] The laminated film according to any one of [1] to [5], wherein the surface layer (B) has a porosity shown by the following expression (3) of from 40 to 60%, that is larger than a porosity of the base layer (A):

$$\text{Porosity of surface layer}(B)(\%) = \frac{\rho(B)_0 - \rho(B)}{\rho(B)_0} \times 100 \tag{3}$$

wherein $\rho(B)_0$ represents a true density of the surface layer (B), and $\rho(B)$ represents a density of the surface layer (B).

[7] The laminated film according to any one of [1] to [6], wherein the base layer (A) and the surface layer (B) are laminated by any measure of co-extrusion forming, extrusion lamination forming, and thermal lamination forming.

[8] The laminated film according to any one of [1] to [7], wherein the base layer (A) is stretched biaxially, and the surface layer (B) is stretched uniaxially.

[9] A label containing a film and an adhesive layer (C) provided on one surface of the film, the film having an internal bond strength measured according to TAPPI T569 of from 0.5 to 0.95 kg·cm on a side of the adhesive layer (C).

[10] The label according to [9], wherein the film is the laminated film according to any one of [1] to [8], and the surface of the laminated film on the side of the base layer (A) is in contact with the adhesive layer (C).

[11] The label according to [9], wherein the film contains a thermoplastic resin and at least one of inorganic fine powder and an organic filler, is stretched in at least one direction, and is a single layer film (S) (which is a single layer of the base layer (A)) having a porosity shown by the following expression (4) of from 30 to 70%, and one surface of the single layer film (S) is in contact with the adhesive layer (C):

$$\text{Porosity of single layer film}(\%) = \frac{\rho_0 - \rho}{\rho_0} \times 100 \quad (4)$$

wherein $\rho_0$ represents a true density of the single layer film, and $\rho$ represents a density of the single layer film.

[12] The label according to any one of [9] to [11], wherein the label has printed information on the surface on the side of the surface layer (B).

[13] The label according to any one of [9] to [12], wherein the adhesive layer (C) is provided discontinuously.

[14] The label according to any one of [9] to [13], wherein the label has a half cut line on at least one surface of the film.

[15] The label according to any one of [9] to [14], wherein the label has an adhesion inhibiting part on a surface of the film in contact with the adhesive layer (C).

[16] The label according to any one of [9] to [15], wherein the label has an adhesion inhibiting part on a surface of the adhesive layer (C).

[17] The label according to any one of [9] to [16], wherein the label has a release material (D) on a surface of the adhesive layer (C).

[18] An adherend having a label, containing the label according to any one of [9] to [16], and an adherend having the label adhered thereto.

[19] The adherend having a label according to [18], wherein the adherend has a heterogeneous structure.

[20] A method for producing a label, containing providing an adhesive layer (C) on a surface of a film, and then laminating a release material (D) on the adhesive layer (C), in which the film is the laminated film according to any one of [1] to [8], and the adhesive layer (C) is provided on the surface of the laminated film on the side of the base layer (A); or the film is a single layer film (S) containing a thermoplastic resin and at least one of inorganic fine powder and an organic filler, being stretched in at least one direction, and having a porosity shown by the expression (4) of from 30 to 70%, and the adhesive layer (C) is provided on one surface of the single layer film (S).

[21] A method for producing a label, containing providing an adhesive layer (C) on a release material (D), and then laminating a film on the adhesive layer (C), in which the film is the laminated film according to any one of [1] to [8], and the laminated film is laminated in such a manner that the surface thereof on the side of the base layer (A) is in contact with the adhesive layer (C); or the film is a single layer film (S) containing a thermoplastic resin and at least one of inorganic fine powder and an organic filler, being stretched in at least one direction, and having a porosity shown by the expression (4) of from 30 to 70%, and the single layer film (S) is laminated in such a manner that one surface thereof is in contact with the adhesive layer (C).

[22] A method for using a label, containing providing the adherend having a label according to [18] or [19], and then breaking the label while peeling the label from the adherend.

Example

The invention will be described more specifically with reference to production examples, examples and comparative examples below. The materials, the amounts used, the ratios, the procedures and the like shown below may be appropriately changed unless they deviate from the substance of the invention. Accordingly, the invention is not limited to the specific examples shown below. In the following description, a film and a laminated film may be generically referred to as a film.

Evaluation Methods

Thickness

The thickness of the film or the laminated film obtained in the following examples and comparative examples was measured with a thickness meter (produced by HyBridge Co., Ltd.) according to JIS K7130:1999. The film was cut in a width of 100 mm in the transverse direction to provide a measurement specimen. The measurement specimen was measured for the thickness at 30 points that were equally spaced in the width direction, and the average value thereof was designated as the thickness of the film.

True Density

The resin compositions a to h used for the film and the laminated film each were molded into a sheet having a thickness of 0.5 mm by pressing with a pressing machine (Mini Test Press, produced by Toyo Seiki Seisaku-sho, Ltd.) at a temperature of 230° C. and a pressure 15 MPa. The resin molded article in the form of a sheet was cut into a size of 15 mm×15 mm to produce a measurement specimen. The true density thereof was measured with an electronic densitometer (SD-200L, produced by Alfa Mirage Co., Ltd.) according to the method A of JIS K7112:1999. The measurement specimen was measured for the weight in the air and after immersed in pure water. The true density of the measurement specimen was calculated from the difference between the weight measured in the air and the weight measured after immersing in pure water according to the following expression.

$$\rho_0 = m_{S,A} \times \rho_{IL} / (m_{S,A} - m_{S,IL})$$

wherein $\rho_0$ represents the true density of the measurement specimen (g/cm$^2$) $m_{S,A}$ represents the weight of the measurement specimen measured in the air (g), $m_{S,IL}$ represents the unadjusted weight of the measurement specimen measured after immersing in pure water (g), and $\rho_{IL}$ represents the density of pure water (g/cm$^2$).

Density

In the films obtained in the following examples and comparative examples, the film formed only of the base layer (A) was used as it is, whereas the laminated film was delaminated at the interface between the base layer (A) and the surface layer (B), and the film formed only of the base layer (A) or the base layer (A) and the surface layer (B) each were cut into 10 sheets with a size of 100 mm×100 mm, which were designated as measurement specimens. The measurement specimen was measured for the density according to JIS P8118:1998. The measurement specimen was measured for the thickness for two sheets thereof at 20 points in total with a thickness meter (produced by HyBridge Co., Ltd.), and the average value thereof was designated as the thickness of the measurement specimen. The measurement specimen was measured for the basis weight in such a manner that the 10 sheets of the measurement specimens were measured for the mass with an analytical balance (AB265-S, produced by Mettler-Toledo International Inc.), and the basis weight was calculated from the measured values. The density was calculated from the thickness and the basis weight thus obtained, according to the following expression.

$$D = W/(T \times 1000)$$

wherein D represents the density (g/cm³), W represents the basis weight (g/m²), and T represents the thickness (mm).

Internal Bond Strength

The internal bond strength was measured with an internal bond strength measuring device (Internal Bond Tester, produced by Kumagai Riki Kogyo Co., Ltd.) according to TAPPI T569. The film or the laminated film obtained in the following example or comparative example was cut into a size of 50 mm×20 mm, and a cellophane adhesive tape (Cellotape CT-15, a trade name, produced by Nichiban Co., Ltd.) was adhered to one surface thereof on the side where the adhesive layer (C) was to be provided. An aluminum angle was attached to the adhered surface, and the opposite surface was held by the prescribed holder. An impact is applied to the aluminum angle by beating the aluminum angle with a hammer at an angle of 90°, and the delamination energy thereon was measured. The operation was repeated three times, and the average value thereof was designated as the internal bond strength on the side of the adhesive layer (C). The surface of the film cut into a size of 50 mm×20 mm opposite to the side where the adhesive layer (C) was to be provided was also applied with the cellophane adhesive tape, and measured for the delamination energy in the same manner as above, and the average value thereof was designated as the internal bond strength on the opposite side.

In the case where the film is formed only of the base layer (A), the internal bond strength of the film thus measured shows the internal bond strength of the base layer (A).

In the case where the film is the laminated film of the base layer (A) and the surface layer (B), the measured value obtained through delamination measured by fixing the surface of the base layer (A) on the side of the adhesive layer (C) to the aluminum angle, i.e., the internal bond strength on the side of the adhesive layer (C), shows the internal bond strength of the base layer (A), and the measured value obtained through delamination measured by fixing the opposite surface on the side of the surface layer (B) to the aluminum angle, i.e., the internal bond strength on the opposite side, shows the internal bond strength of the surface layer (B).

In Table 3, the measured value of the internal bond strength of the film is expressed as the internal bond strength of the base layer (A) or the internal bond strength of the surface layer (B).

Tensile Stress at Break

In the films obtained in the following examples and comparative examples, the film formed only of the base layer (A) was used as it is, whereas the laminated film was delaminated at the interface between the base layer (A) and the surface layer (B), and the film formed only of the base layer (A) or the base layer (A) and the surface layer (B) each were cut into 3 sheets or more with a size of 150 mm×15 mm, which were designated as measurement specimens. The measurement specimen was measured for the thickness at 5 points for each specimen with a thickness meter (produced by HyBridge Co., Ltd.), and the average value thereof was designated as the thickness of the measurement specimen. The cross sectional area of the measurement specimen was obtained by multiplying the thickness by the width of the specimen (15 mm). The measurement specimen was measured for the tensile stress at break according to JIS K7161:1994. Specifically, the measurement specimen was pulled with a tensile tester (Model RTM, produced by Orientec Co., Ltd.) at a speed of 200 ram/min, and the load on breaking of the measurement specimen was measured. The operation was repeated three times, and the average value thereof was designated as the load on breaking.

The tensile stress at break was calculated according to the following expression, i.e., by dividing the load on breaking by the cross sectional area of the measurement specimen.

$$\sigma = F/A$$

wherein σ represents the tensile stress at break (MPa), F represents the load on breaking (kg), and A represents the cross sectional area of specimen (mm²).

Adhesion Strength

The laminated film obtained in the following example or comparative example was cut into a size of 150 mm×15 mm to prepare a measurement specimen. For the adhesion strength between the base layer (A) and the surface layer (B) of the laminated film, the load that was required for delaminating the interface between the base layer (A) and the surface layer (B) at a speed of 300 ram/min was measured with a tensile tester (Model RTM, produced by Orientec Co., Ltd.) according to JIS K6854-2:1999. The operation was repeated three times, and the average value thereof was designated as the adhesion strength.

Breaking Property of Label

The release material (D) was peeled from the label obtained in the following example or comparative example, and the label containing the film and the adhesive layer (C) was adhered to a PET film (produced by Daikyo Co., Ltd., thickness: 100 μm) as an adherend, thereby producing an adherend having a label having a structure containing the film, the adhesive layer (C), and the PET film. The adherend having the label was cut to a size of 150 mm×15 mm to prepare a measurement specimen. Subsequently, one end of a cellophane adhesive tape (Cellotape CT-15, a trade name, produced by Nichiban Co., Ltd.) was adhered to the film, and the interface between the base layer (A) and the adhesive layer (C) was carefully delaminated with a cutter knife in such a manner that the other end of the adhesive tape was held with the hand and lightly pulled to raise the base layer (A). The interface was delaminated only in 10 mm, and the adhesive tape was designated as a grasp portion. Subsequently, the film and the PET film were subjected to 180° peeling at a speed of 300 mm/rain according to JIS K6854-2:1999 with a tensile tester (Model RTM, produced by Orientec Co., Ltd.), and the state of the label after peeling by 100 mm was evaluated according to the following standard. The evaluation "broken" was designated as pass.

Broken: The film was broken through cohesion failure within a peeling length of 100 mm or less.

Interlayer delamination: The film was not broken within a peeling length of 100 mm or less, and suffered interlayer delamination at the interface between the base layer (A) and the surface layer (B).

No breaking: The film was not broken within a peeling length of 100 mm or less, and suffered interlayer delamination at the interface between the adhesive, layer (C) and the PET film or the interface between the film and the adhesive layer (C).

Breaking Length

In the evaluation of the breaking property above, the breaking length was obtained from the distance on peeling until the film or the laminated film was completely broken. The measurement of the distance was repeated three times, and the average value thereof was designated as the breaking length.

Brittle Adherend Damage Test

The evaluation of the breaking property above was pert ° Lilted except that the adherend was changed from the PET film to a corrugated fiberboard (a corrugated fiberboard formed of a liner having a basis weight of 170 g/m², class LC according to JIS P3902:2011, and a core having a basis weight of 125 g/m², class MB according to JIS P3904:2011, internal bond strength: 1.0 kg·cm), and the label was adhered to the adherend in such a manner that the longitudinal stretching direction of the label was in parallel to the machine direction of the corrugating machine for corrugating the core, and the breaking property of the label was evaluated according to the following standard. The evaluations "label broken" was designated as pass.

Label broken: The label was broken through cohesion failure within a peeling length of 100 mm or less, but the adherend was not damaged.

Adherend damaged: The label was not broken within a peeling length of 100 mm or less, but the interior of the adherend suffered cohesion failure.

Interlayer delamination: The film was not broken within a peeling length of 100 mm or less, and suffered interlayer delamination at the interface between the base layer (A) and the surface layer (B).

Production Examples, Examples, and Comparative Examples

The materials and the mixing ratios of resin compositions a to h used in Production Examples are shown in Table 1.

Production Example of Resin Composition a

A mixture containing 60% by mass of a propylene homopolymer (Novatec PP FY6Q, a trade name, produced by Japan Polypropylene Corporation), 14% by mass of a propylene homopolymer (Novatec PP MA3Q, a trade name, produced by Japan Polypropylene Corporation), 10% by mass of high density polyethylene (Novatec HD HJ360, a trade name, produced by Japan Polyethylene Corporation), and 16% by mass of heavy calcium carbonate (Softon 1800, a trade name, produced by Bihoku Funka Kogyo Co., Ltd.) was melt-kneaded in a twin screw kneader set at 210° C., then extruded from an extruder set at 230° C. to a strand form, and after cooling, cut with a strand cutter, thereby producing pellets of the resin composition.

Production Examples of Resin Compositions b to g

Pellets of the resin compositions b to g were produced in the same manner as in the production of the resin composition a except that the formulation of the resin composition in Production Example of the resin composition a was changed as shown in Table 1. In the production of the resin composition g, the mixture was melt-kneaded in a twin screw kneader set at 170° C., and then extruded from an extruder set at 190° C. to a strand form.

Example 1

The resin composition b used as the base layer (A) was melt-kneaded in an extruder set at 230° C., then fed to a T-die set at 250° C., extruded from the T-die into a sheet, and cooled with a cooling device to provide an unstretched sheet. The unstretched sheet was heated to 142° C. and stretched in the longitudinal direction in a stretching ratio of 4 times by utilizing a difference in circumferential velocity of a group of rolls, thereby providing a uniaxially stretched sheet.

Separately from the above, the resin composition e used as the surface layer (B) was melt-kneaded in an extruder set at 250° C., then fed to a T-die set at 250° C., extruded from the T-die into a sheet, and laminated on one surface of the uniaxially stretched sheet obtained above, and the laminated

TABLE 1

| | Materials | | Resin composition, mixing ratio (% by mass) | | | | | | | |
|---|---|---|---|---|---|---|---|---|---|---|
| | | | a | b | c | d | e | f | g | h |
| Thermoplastic resin | Propylene homopolymer | trade name: Novatec PP FY6Q produced by Japan Polypropylene Corporation MFR: 2.4 g/10 min (230° C., 2.16 kg load) melting point: 164° C. (DSC peak temperature) | 60 | 55 | 50 | 31 | 21.5 | 34 | 17 | — |
| | Propylene homopolymer | trade name: Novatec PP MA3Q produced by Japan Polypropylene Corporation MFR: 9.2 g/10 min (230° C., 2.16 kg load) melting point: 165° C. (DSC peak temperature) | 14 | 12 | 10 | 20.5 | 20 | 42 | 42 | — |
| | High density polyethylene | trade name: Novatec HD HJ360 produced by Japan Polyethylene Corporation MFR: 5.5 g/10 min (190° C., 2.16 kg load) melting point: 132° C. (DSC peak temperature) | 10 | 10 | 10 | 3.5 | 3.5 | — | — | — |
| | | trade name: Novatec HD HY430 produced by Japan Polyethylene Corporation MFR: 0.8 g/10 min (190° C., no load) melting point: 135° C. (DSC peak temperature) | — | — | — | — | — | — | — | 33.7 |
| Inorganic fine powder | Heavy calcium carbonate | trade name: Softon 1800 produced by Bihoku Funka Kogyo Co., Ltd. obtained by dry pulverization and classification average particle diameter: 1.2 μm (median diameter) | 16 | 23 | 30 | 45 | 55 | — | — | 65.8 |
| | | trade name: Calcine YM30 produced by Maruo Calcium Co., Ltd. average particle diameter: 0.3 μm (median diameter) | — | — | — | — | — | 23 | 40 | — |
| Dispersant | Maleic acid-modified polypropylene | trade name: Umex 1001 produced by Sanyo Chemical Industries, Ltd. acid modification degree: 5% softening point: 154° C. | — | — | — | — | — | 1 | 1 | 0.5 |

—: not used sheet was cooled to 60° C., thereby providing a laminated sheet having two layers with two kinds containing the base layer (A) and the surface layer (B) (resin composition b and resin composition e).

The laminated film having two layers with two kinds obtained above was again heated to 148° C., stretched in the transverse direction in a stretching ratio of 9 times by utilizing a tenter, annealed at 160° C., cooled to 60° C., and slit for the edges thereof, thereby providing a laminated film.

The laminated film had a total thickness of 69 μm and a two-layer structure containing the base layer (A) and the surface layer (B) (thickness of the layers: 51 μm and 18 μm, porosity of layers: 33% and 42%, number of axis of stretching of layers: biaxially and uniaxially).

Subsequently, polyethylene films were laminated on both surfaces of wood-free paper, and one surface thereof was subjected to a silicone treatment, thereby producing a release material (D). The release material (D) had a thickness of 173 μm and a density of 0.9 g/m$^3$.

On the silicone-treated surface of the release material (D), a solvent type acrylic adhesive (Oribain BPS1109, produced by Toyo Ink Co., Ltd.) was coated with a comma coater to a coated amount of 30 g/m$^2$ after drying, and dried to form an adhesive layer (C), thereby providing a laminated sheet containing the adhesive layer (C) and the release material (D).

The lamination was performed by the first production method in such a manner that the surface of the laminated sheet on the side of the adhesive layer (C) and the surface of the laminated film on the side of the base layer (A) were in contact with each other, thereby providing a label having a laminated structure containing the surface layer (B), the base layer (A), the adhesive layer (C), and the release material (D).

Examples 2 to 5

Laminated films each having the densities of the base layer (A) and the surface layer (B) changed as shown in Table 2 were obtained in the same manner as in Example 1 except that in Example 1, the heating temperature on longitudinally stretching the unstretched sheet for the base layer (A) at a ratio of 4 times was changed from 142° C. to the temperature shown in Table 2, and the heating temperature of the two kinds and two layers laminated sheet on transversally stretching at a ratio of 9 times was changed from 148° C. to the temperature shown in Table 2, and labels of Examples 2 to 5 were obtained by using the laminated films.

Comparative Examples 1 to 3

Laminated films were obtained in the same manner as in Example 1 except that in Example 1, the resin compositions shown in Table 2 were used for the base layer (A) and the surface layer (B), the heating temperature of the unstretched sheet on longitudinally stretching at a ratio of 4 times was changed from 142° C. to the temperature shown in Table 2, and the heating temperature of the two kinds and two layers laminated sheet on transversally stretching at a ratio of 9 times was changed from 148° C. to the temperature shown in Table 2, and labels of Comparative Examples 1 to 3 were obtained by using the laminated films.

TABLE 2

Laminated film and Single layer film

| | Resin composition | | Thickness (μm) | | | Density (g/m$^3$) | | Number of axis of stretching | | Stretching temperature (° C.) | |
|---|---|---|---|---|---|---|---|---|---|---|---|
| | Base layer (A) (A1/A2) | Surface layer (B) (B1/B2) | Total | Base layer (A) (A1/A2) | Surface layer (B) (B1/B2) | Base Layer (A) | Surface Layer (B) | Base Layer (A) | Surface layer (B) (B1/B2) | MD | TD |
| Example 1 | b | e | 69 | 51 | 18 | 0.72 | 0.81 | biaxially | uniaxially | 142 | 148 |
| Example 2 | b | e | 82 | 61 | 22 | 0.66 | 0.78 | biaxially | uniaxially | 140 | 145 |
| Example 3 | b | e | 83 | 63 | 20 | 0.59 | 0.72 | biaxially | uniaxially | 138 | 143 |
| Example 4 | b | e | 89 | 66 | 23 | 0.57 | 0.71 | biaxially | uniaxially | 135 | 141 |
| Example 5 | b/f | e | 83 | 59/2 | 22 | 0.66 | 0.78 | biaxially | uniaxially | 140 | 145 |
| Example 6 | b/g | e | 81 | 56/2 | 23 | 0.51 | 0.67 | biaxially | uniaxially | 125 | 135 |
| Example 7 | b | e/d | 85 | 61 | 22/2 | 0.66 | 0.78 | biaxially | uniaxially | 140 | 145 |
| Example 8 | c | — | 73 | 73 | — | 0.44 | — | biaxially | — | 132 | 148 |
| Example 9 | h | — | 120 | 120 | — | 0.73 | — | biaxially | — | 110 | 120 |
| Example 10 | h/c | — | 83 | 80/3 | — | 0.76 | — | uniaxially | — | 113 | — |
| Comparative Example 1 | b | d | 83 | 68 | 16 | 0.57 | 0.82 | biaxially | uniaxially | 135 | 150 |
| Comparative Example 2 | c | d | 97 | 73 | 24 | 0.44 | 0.71 | biaxially | uniaxially | 130 | 144 |
| Comparative Example 3 | a | e | 56 | 37 | 18 | 0.70 | 0.71 | biaxially | uniaxially | 140 | 140 |

Example 6

A laminated film of three kinds and three layers containing the base layer (A1), the base layer (A2), and the surface layer (B) (resin composition b, resin composition f, and resin composition e) were obtained in the same manner as in Example 2 except that the T-die used for producing the unstretched sheet for the base layer (A) was changed to a two-kind and two-layer T-die, and the resin composition b for the base layer (A1) (main layer) was melt-kneaded and extruded to the T-die with an extruder set at 230° C., whereas the resin composition f for the base layer (A2) (skin layer) was melt-kneaded and extruded to the T-die with another extruder set at 230° C., and the resin compositions were laminated in the T-die set at 250° C., thereby forming an unstretched sheet containing two layers with two kinds formed of the resin composition f and the resin composition b, and a label was obtained there with.

The laminated film had a total thickness of 83 μm and a three-layer structure containing the base layer (A1), the base layer (A2), and the surface layer (B) (thickness of the layers: 59 μm, 2 μm, and 22 μm, porosity of layers: 38%, 38%, and 45%, number of axis of stretching of layers: biaxially, biaxially, and uniaxially). The thicknesses of the base layer (A1) and the base layer (A2) in the laminated film were calculated from the observed image with a scanning electron microscope.

Example 7

A laminated film of three kinds and three layers containing the base layer (A), the surface layer (B1), and the surface layer (B2) (resin composition b, resin composition e, and resin composition g) were obtained in the same manner as in Example 2 except that the T-die used for producing the surface layer (B) was changed to a two-kind and two-layer T-die, and the resin composition e for the surface layer (B1) was extruded with an extruder set at 250° C., whereas the resin composition g for the surface layer (B2) was extruded with another extruder set at 250° C., and the resin compositions were laminated in the T-die, then extruded into a sheet, and laminated on one surface of the uniaxially stretched sheet.

The laminated film had a total thickness of 85 μm and a three-layer structure containing the base layer (A), the surface layer (B1), and the surface layer (B2) (thickness of the layers: 61 μm, 22 μm, and 2 μm, porosity of layers: 38%, 45%, and 45%, number of axis of stretching of layers: biaxially, uniaxially, and uniaxially). The thicknesses of the surface layer (B1) and the surface layer (B2) in the laminated film were calculated from the observed image with a scanning electron microscope.

Example 8

The resin composition c for the film was melt-kneaded in an extruder set at 230° C., then fed to a single layer T-die set at 250° C., extruded from the T-die into a sheet, and cooled with a cooling device to provide an unstretched sheet. The unstretched sheet was heated to 132° C. and stretched in the longitudinal direction in a ratio of 4 times by utilizing a difference in circumferential velocity of a group of rolls, thereby providing a uniaxially stretched sheet. The uniaxially stretched sheet was again heated to 148° C., stretched in the transverse direction in a ratio of 9 times by utilizing a tenter, annealed at 160° C., cooled to 60° C., and slit for the edges thereof, thereby providing a film (thickness: 73 μm, porosity: 60%, number of axis of stretching: biaxially).

Subsequently, polyethylene films were laminated on both surfaces of wood-free paper, and one surface thereof was subjected to a silicone treatment, thereby producing a release material (D). The release material (D) had a thickness of 173 μm and a density of 0.9 g/m³.

On the silicone-treated surface of the release material (D), a solvent type acrylic adhesive (Oribain BPS1109, produced by Toyo Ink Co., Ltd.) was coated with a comma coater to a coated amount of 30 g/m² after drying, and dried to form an adhesive layer (C), thereby providing a laminated sheet containing the adhesive layer (C) and the release material (D).

The lamination was performed by the first production method in such a manner that the surface of the laminated sheet on the side of the adhesive layer (C) and the aforementioned film were laminated on each other, thereby providing a label having a laminated structure containing the film, the adhesive layer (C), and the release material (D).

Example 9

The resin composition h for the film was melt-kneaded in an extruder set at 180° C., then fed to a single layer T-die set at 190° C., extruded from the T-die into a sheet, and cooled to 40° C. with a cooling device to provide an unstretched sheet. The unstretched sheet was heated to 110° C. and stretched in the longitudinal direction in a ratio of 2 times by utilizing a difference in circumferential velocity of a group of rolls, followed by cooling to 60° C., thereby providing a uniaxially stretched sheet. The uniaxially stretched sheet was again heated to 120° C., stretched in the transverse direction in a ratio of 2 times by utilizing a tenter, annealed at 130° C., cooled to 60° C., and slit for the edges thereof, thereby providing a film (thickness: 120 μm, porosity: 58%, number of axis of stretching: biaxially).

Subsequently, polyethylene films were laminated on both surfaces of wood-free paper, and one surface thereof was subjected to a silicone treatment, thereby producing a release material (D). The release material (D) had a thickness of 173 μm and a density of 0.9 g/m³.

On the silicone-treated surface of the release material (D), a solvent type acrylic adhesive (Oribain BPS1109, produced by Toyo Ink Co., Ltd.) was coated with a comma coater to a coated amount of 30 g/m² after drying, and dried to form an adhesive layer (C), thereby providing a laminated sheet containing the adhesive layer (C) and the release material (D).

The lamination was performed by the first production method in such a manner that the surface of the laminated sheet on the side of the adhesive layer (C) and the aforementioned film were laminated on each other, thereby providing a label having a laminated structure containing the film, the adhesive layer (C), and the release material (D).

Example 10

The resin composition h for the base layer (A1) (main layer) was melt-kneaded in an extruder set at 180° C., then fed to a two-layer T-die set at 230° C. Separately, the resin composition c for the base layer (A2) (skin layer) was extruded from another extruder set at 230° C. and fed to the two-layer T-die. The resin compositions were laminated in the two-layer T-die, co-extruded from the T-die into a sheet, and cooled to 60° C. with a cooling device to provide an unstretched sheet containing two layers with two kinds formed of the resin composition c and the resin composition h.

The unstretched sheet was heated to 110° C. and stretched in the longitudinal direction in a ratio of 5 times by utilizing a difference in circumferential velocity of a group of rolls, annealed at 130° C., cooled to 60° C., and slit for the edges thereof, thereby providing the base layer (A) (containing the main layer (A1) and the skin layer (A2), thickness: 80 μm and 3 μm, porosity: 55% and 55%, number of axis of stretching: uniaxially and uniaxially). The thickness of the base layer (A1) and the base layer (A2) are calculated from the observed image with a scanning electron microscope.

On the surface thereof on the side of the base layer (A1), a solvent type acrylic adhesive (Oribain BPS1109, produced by Toyo Ink Co., Ltd.) was coated with a comma coater to a coated amount of 30 g/m² after drying, and dried to form an adhesive layer (C), thereby providing a label containing the base layer (A2), the base layer (A1), and the adhesive layer (C).

Separately, polyethylene films were laminated on both surfaces of wood-free paper, and one surface thereof was subjected to a silicone treatment, thereby producing a release material (D). The release material (D) had a thickness of 173 μm and a density of 0.9 g/m³.

The lamination was performed by the second production method in such a manner that the surface of the label obtained above on the side of the adhesive layer (C) and the silicone-treated surface of the release material (D) were laminated on each other, thereby providing a label having a laminated structure containing the base layer (A2), the base layer (A1), the adhesive layer (C) and the release material (D).

In the examples, while the label peeling test is performed in MD, the adherend having the label satisfies the relationship of the expression (1) in TD, and therefore, in the adherend having the label, the label is similarly broken on peeling the label in TD.

INDUSTRIAL APPLICABILITY

According to the label of the invention, the label is broken on opening a package and is difficult to be restored, and thus the label may be used as a sealing label. Furthermore, the label is broken on peeling the label from the adherend having the label and is difficult to be restored, and thus the label may be used as a security label. Moreover, the internal bond strength of the film is set to the particular range, and

TABLE 3

| | Film | | | | | | | | | Label | | |
|---|---|---|---|---|---|---|---|---|---|---|---|---|
| | Base layer (A) | | | | Surface layer (B) | | | | | | Peeling test | |
| | Thickness (μm) | | | Tensile | Internal bond | | Tensile | Internal bond | Interlayer | | | Brittle |
| | Base layer (A) | Surface layer (B) | Porosity (%) | stress at break (MPa) | strength (kg · cm) (A1/A2) | Porosity (%) | stress at break (MPa) | strength (kg · cm) | adhesion strength (N/15 mm) | Breaking property | Breaking length | Adherend Damage Test |
| | | | | MD TD | | | MD TD | | | | | |
| Example 1 | 51 | 18 | 33 | 55.9 112.7 | 0.92 | 42 | 51.9 97.7 | 0.63 | 15 | broken | 35 | label broken |
| Example 2 | 61 | 22 | 38 | 51.0 106.7 | 0.83 | 45 | 45.9 83.6 | 0.61 | 15 | broken | 27 | label broken |
| Example 3 | 63 | 20 | 45 | 44.0 98.3 | 0.65 | 49 | 37.9 65.0 | 0.50 | 13 | broken | 17 | label broken |
| Example 4 | 66 | 23 | 47 | 42.1 95.9 | 0.60 | 50 | 35.9 60.3 | 0.48 | 12 | broken | 14 | label broken |
| Example 5 | 61 | 22 | 38 | 50.7 106.7 | 0.85 | 45 | 46.0 83.3 | 0.61 | 15 | broken | 27 | label broken |
| Example 6 | 58 | 23 | 52 | 38.1 91.8 | 0.45 | 53 | 30.2 46.5 | 0.44 | 12 | broken | 12 | label broken |
| Example 7 | 61 | 24 | 38 | 50.7 106.7 | 0.83 | 45 | 46.0 83.3 | 1.30 | 15 | broken | 27 | label broken |
| Example 8 | 73 | — | 60 | 29.2 80.0 | 0.52/0.52 | — | — — | — | — | broken | 12 | label broken |
| Example 9 | 120 | — | 58 | 31.2 82.7 | 0.50/0.50 | — | — — | — | — | broken | 11 | label broken |
| Example 10 | 83 | — | 55 | 34.2 86.3 | 0.50/0.50 | — | — — | — | — | broken | 10 | label broken |
| Comparative Example 1 | 68 | 16 | 47 | 42.1 95.9 | 0.60 | 37 | 61.9 121.0 | 1.90 | 10 | interlayer delamination | — | interlayer delamination |
| Comparative Example 2 | 73 | 24 | 63 | 29.2 80.3 | 0.52 | 45 | 45.9 83.6 | 1.73 | 5 | interlayer delamination | — | interlayer delamination |
| Comparative Example 3 | 37 | 18 | 28 | 58.8 116.3 | 1.10 | 50 | 35.9 60.3 | 0.48 | 15 | no breaking | — | adherend damaged |

It was understood from Table 3 that in the adherends having the label obtained by adhering the labels of Examples 1 to 9, in which the internal bond strength of the base layer (A) (i.e., the internal bond strength on the side of the adhesive layer (C)) was from 0.4 to 0.95 kg·cm, and the internal bond strength on the opposite side was from 0.4 to 1.5 kg·cm, on the adherend, the label was broken on peeling the label. On the other hand, in the adherends having the label obtained by adhering the labels of Comparative Examples 1 and 2, in which the internal bond strength on the opposite side was 1.90 kg·cm and 1.73 kg·cm respectively, to the adherend, such a result was obtained that the laminated film suffered interlayer delamination between the base layer (A) and the surface layer (B) on peeling the label. The observation of the broken surface revealed that although the breaking started in the base layer (A), the breaking reaching the interface between the base layer (A) and the surface layer (B) failed to transfer to breaking of the surface layer (B) but transferred to the interface delamination. In the adherend having the label obtained by adhering the label of Comparative Example 3, in which the internal bond strength of the base layer (A) was 1.1 kg·cm, to the adherend, such a result was obtained that the label was not broken on peeling the label, but the label was cleanly peeled from the adherend.

thus the label may be applied to a brittle adherend, such as paper, a paper board and a corrugated fiberboard.

REFERENCE SIGN LIST (A) base layer
(B) surface layer
(C) adhesive layer

What is claimed is:
1. A label containing a film containing
a base layer (A),
a surface layer (B) on one surface of base layer (A), and
an adhesive layer (C) provided in contact with a surface of the base layer (A) opposite to the surface facing surface layer (B),
the base layer (A) having a thickness of from 30 μm to 140 μm and comprising
a thermoplastic resin and
at least one of an inorganic fine powder and an organic filler, and being stretched in at least one direction,
the film having an internal bond strength measured according to TAPPI T569 of from 0.4 to 0.95 kg·cm on a side of the base layer (A) and from 0.4 to 1.5 kg·cm on a side of the surface layer (B), the base layer (A) having a porosity shown by the following expression (1) of from 30 to 70%:

$$\text{Porosity of base layer}(A)(\%) = \frac{\rho(A)_0 - \rho(A)}{\rho(A)_0} \times 100 \quad (1)$$

wherein, in the expression (1), $\rho(A)_0$ represents a true density of the base layer (A), and $\rho(A)$ represents a density of the base layer (A), the surface layer (B) having a porosity shown by the following expression (3) of from 40 to 70%:

$$\text{Porosity of surface layer}(B)(\%) = \frac{\rho(B)_0 - \rho(B)}{\rho(B)_0} \times 100 \quad (3)$$

wherein, in the expression (3), $\rho(B)_0$ represents a true density of the surface layer (B), and $\rho(B)$ represents a density of the surface layer (B), the porosity of the surface layer (B) is larger than a porosity of the base layer (A).

2. The label according to claim 1, wherein the thermoplastic resin contains at least one selected from the group consisting of a polyethylene-based resin, a polypropylene-based resin, a polyolefin-based resin, a polyamide-based resin, a thermoplastic polyester-based resin, polycarbonate, and a polystyrene-based resin.

3. The label according to claim 1, wherein the base layer (A) and the surface layer (B) have tensile stresses at break measured according to JIS K7161:1994 that satisfy the following expression (2):

$$\sigma_B(A) > \sigma_B(B) \quad (2)$$

wherein $\sigma_B(A)$ represents the tensile stress at break (MPa) of the base layer (A) on pulling in the machine direction (MD), and $\sigma_B(B)$ represents the tensile stress at break (MPa) of the surface layer (B) on pulling in the MD.

4. The label according to claim 1, wherein an adhesion strength between the base layer (A) and the surface layer (B) measured according to JIS K6854-2:1999 is 7.7 N/15 mm or more.

5. The label according to claim 1, wherein the film is a laminate film formed by laminating the base layer (A) and the surface layer (B) constituting the film with any measure of co-extrusion forming, extrusion lamination forming, and thermal lamination forming.

6. The label according to claim 1, wherein the base layer (A) is stretched biaxially, and the surface layer (B) is stretched uniaxially.

7. The label according to claim 1, wherein the label has printed information on at least one of a surface of the label opposite to the adhesive layer (C) or a surface of the base layer (A) on a side of the adhesive layer (C).

8. The label according to claim 1, wherein the adhesive layer (C) is provided discontinuously on a surface of the base layer (A).

9. The label according to claim 1, wherein the label has an adhesion inhibiting part on a surface of the base layer (A) on a side of the adhesive layer (C).

10. The label according to claim 1, wherein the adhesive layer (C) has an emboss shape.

11. The label according to claim 1 wherein the label further contains a release material (D) on a surface of the adhesive layer (C).

12. A labeled adherend, containing
the label according to claim 1, and
an adherend having the label adhered thereto.

13. A method for producing the label according to claim 11, containing providing the adhesive layer (C) on a surface of the base layer (A), and then providing the release material (D) on the adhesive layer (C).

14. A method for producing the label according to claim 11, containing providing the adhesive layer (C) on the release material (D), and then laminating the base layer (A) on the adhesive layer (C).

15. A method for using a label, containing breaking the label on peeling the label from the adherend having a label according to claim 12.

* * * * *